United States Patent
Zhu et al.

(10) Patent No.: US 12,328,777 B2
(45) Date of Patent: Jun. 10, 2025

(54) DATA TRANSMISSION METHOD AND APPARATUS

(71) Applicant: Huawei Technologies Co., Ltd., Shenzhen (CN)

(72) Inventors: Haoren Zhu, Shanghai (CN); Huan Li, Shenzhen (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 451 days.

(21) Appl. No.: 17/709,212

(22) Filed: Mar. 30, 2022

(65) Prior Publication Data

US 2022/0225443 A1    Jul. 14, 2022

Related U.S. Application Data

(63) Continuation of application No. PCT/CN2020/119557, filed on Sep. 30, 2020.

(30) Foreign Application Priority Data

Sep. 30, 2019   (CN) .......................... 201910944845.9

(51) Int. Cl.
*H04W 76/11* (2018.01)
*H04L 67/104* (2022.01)
(Continued)

(52) U.S. Cl.
CPC .......... *H04W 76/11* (2018.02); *H04L 67/1044* (2013.01); *H04L 67/146* (2013.01); *H04W 76/15* (2018.02)

(58) Field of Classification Search
CPC ............................ H04W 76/11; H04L 12/185
(Continued)

(56) References Cited

U.S. PATENT DOCUMENTS

| | | | |
|---|---|---|---|
| 2012/0218942 A1* | 8/2012 | Lu .......................... | H04W 28/06 370/328 |
| 2016/0073404 A1* | 3/2016 | Vutukuri ............... | H04W 72/23 455/552.1 |

(Continued)

FOREIGN PATENT DOCUMENTS

| | | |
|---|---|---|
| CN | 103109553 B | 11/2016 |
| CN | 105075193 B | 5/2018 |

(Continued)

OTHER PUBLICATIONS

Nokia, Nokia Shanghai Bell, "IAB Routing for Architecture 2a," 3GPP TSG-RAN WG3#101, Gothenburg, Sweden, R3-184895, total 5 pages, 3rd Generation Partnership Project, Valbonne, France (Aug. 20-24, 2018).

(Continued)

*Primary Examiner* — Fabricio R Murillo Garcia
(74) *Attorney, Agent, or Firm* — Leydig, Voit & Mayer, Ltd.

(57) ABSTRACT

A data transmission method and apparatus. The method includes: a core network element receives a first message sent by a first terminal device. The first message is used to request to establish a first PDU session. The core network element determines, based on group information corresponding to the first terminal device, that the first terminal device needs to perform local routing. The group information includes a group identifier ID and a group member list. The core network element obtains binding information. The binding information includes the group ID and session information of the first PDU session, and the session information includes one or more of a session ID, a TEID, and a QFIs of the first PDU session. The core network element sends the binding information to a first access network node.

(Continued)

This can implement IAB based local routing, and shorten a transmission latency.

20 Claims, 22 Drawing Sheets

(51) Int. Cl.
    *H04L 67/146*     (2022.01)
    *H04W 76/15*     (2018.01)

(58) Field of Classification Search
    USPC .................................................... 455/414.1
    See application file for complete search history.

(56) References Cited

U.S. PATENT DOCUMENTS

| | | | |
|---|---|---|---|
| 2016/0242216 A1* | 8/2016 | Zhao | H04W 76/40 |
| 2017/0034761 A1 | 2/2017 | Narayanan | |
| 2019/0150219 A1 | 5/2019 | Wang et al. | |
| 2019/0261260 A1 | 8/2019 | Dao et al. | |
| 2019/0297148 A1 | 9/2019 | Zong et al. | |
| 2020/0084663 A1* | 3/2020 | Park | H04W 8/08 |
| 2023/0041912 A1* | 2/2023 | Talebi Fard | H04W 36/0016 |

FOREIGN PATENT DOCUMENTS

| | | |
|---|---|---|
| CN | 109600719 A | 4/2019 |
| CN | 109729125 A | 5/2019 |
| CN | 110167003 A | 8/2019 |

OTHER PUBLICATIONS

ZTE, "Discussion on IAB node discovery and selection," 3GPP TSG-RAN WG2#103bis, Chengdu, China, R2-1814730, total 8 pages, 3rd Generation Partnership Project, Valbonne, France (Oct. 8-12, 2018).

"3rd Generation Partnership Project; Technical Specification Group Services and System Aspects; Service requirements for cyber-physical control applications in vertical domains; Stage 1 (Release 17)," 3GPP TS 22.104 V17.1.0, total 67 pages, 3rd Generation Partnership Project, Valbonne, France (Sep. 2019).

ZTE, Sanechips, "Discussion on IAB node discovery and selection," 3GPP TSG RAN WG3 Meeting #102, Spokane, USA, R3-186420, total 8 pages (Nov. 12-16, 2018).

"3rd Generation Partnership Project; Technical Specification Group Services and System Aspects; Security architecture and procedures for 5G system (Release 16)," 3GPP TS 33.501 V16.0.0, total 196 pages, 3rd Generation Partnership Project, Valbonne, France (Sep. 2019).

LG Electronics Inc., "Report on email discussion [106#47][IAB] Bearer Mapping," 3GPP TSG-RAN WG2 #107, Prague, Czech Republic, R2-1911336, Total 38 pages, 3rd Generation Partnership Project, Valbonne, France (Aug. 26-30, 2019).

AT&T, "IAB Enhancements for Rel 17," 3GPP TSG RAN Plenary Meeting #84, Newport Beach, USA, RP-192109, Total 10 pages 3rd Generation Partnership Project, Valbonne, France (Jun. 3-6, 2019).

"3rd Generation Partnership Project; Technical Specification Group Services and System Aspects; System Architecture for the 5G System (5GS); Stage 2 (Release 16)," 3GPP TS 23.501 V16.2.0, Total 391 pages, 3rd Generation Partnership Project, Valbonne, France (Sep. 2019).

\* cited by examiner

DATA TRANSMISSION METHOD AND APPARATUS

CROSS-REFERENCE TO RELATED APPLICATIONS

This application is a continuation of International Application No. PCT/CN2020/119557, filed on Sep. 30, 2020, which claims priority to Chinese Patent Application No. 201910944845.9, filed on Sep. 30, 2019. The disclosures of the aforementioned applications are hereby incorporated by reference in their entireties.

TECHNICAL FIELD

Embodiments of this application relate to the communications field, and in particular, to a data transmission method and apparatus.

BACKGROUND

Currently, an industrial manufacturing site includes a plurality of devices that require wireless communication, for example, a flexible production line robot, a flexible production line navigation car, and a mobile collaborative robot. Main wireless communication requirements in an industrial manufacturing scenario are local data closed-loop, a low latency, and high reliability. A cycle time of motion control (for example, a printer or a packing machine) needs to fall within 0.5 ms to 2 ms.

An integrated access and backhaul (IAB) architecture mainly includes a donor node and IAB nodes. All the IAB nodes are managed by the centralized donor node. The IAB nodes are cascaded in a form of a spanning tree or a directed acyclic graph, and each IAB node includes a distributed unit (DU) and a mobile terminal (MT) module. During cascading, each IAB node needs to complete non-access stratum (NAS) authentication, and complete an operation, administration and maintenance (OAM) configuration through a session.

In a data transmission solution based on the foregoing IAB architecture, user plane data of all terminal devices needs to be routed to the donor node, and the donor node transmits the user plane data to a data network through a core network (CN). Therefore, the user plane data of the terminal device needs to pass through a multi-hop IAB node, the donor node, and a core network user plane anchor before arriving at the data network. Consequently, a transmission latency is relatively long, and it is difficult to meet an ultra-low latency requirement in the industrial manufacturing scenario.

SUMMARY

Embodiments of this application provide a data transmission method and apparatus, to shorten a transmission latency.

According to a first aspect, this application provides a data transmission method. The method includes:

A core network element receives a first message sent by a first terminal device. The first message is used to request to establish a first protocol data unit (PDU) session.

The core network element determines, based on group information corresponding to the first terminal device that the first terminal device needs to perform local routing. The group information includes a group identifier (ID) and a group member list.

The core network element obtains binding information. The binding information includes the group ID and session information of the first PDU session, and the session information includes one or more of a session ID, a tunnel endpoint identifier (TEID), and a flow identifier (QFIs) of the first PDU session.

The core network element sends the binding information to a first access network node.

According to the data transmission method provided in the first aspect, after receiving the first message sent by the first terminal device, when determining, based on the group information corresponding to the first terminal device, that the first terminal device needs to perform local routing, the core network element obtains the binding information including the group ID and the session information of the first PDU session, and then sends the binding information to the first access network node. The first access network node selects, based on the session information of the first PDU session and local routing node selection information, a first local routing node that provides a local routing service for the first terminal device, and sends first routing information to the first local routing node. The first local routing node may be an IAB node. Therefore, after receiving user plane data sent by the first terminal device, the first local routing node determines, based on an air interface identifier of the first terminal device, a group to which the first terminal device belongs, obtains a corresponding local routing rule through matching based on the group, and finally forwards the user plane data according to the local routing rule and a local switching indication. In this way, IAB based local routing can be implemented, so that user plane data can be directly forwarded inside an IAB node or between IAB nodes, and the data does not need to be transmitted to a donor node and a core network. This can shorten a transmission latency to a maximum extent, and implement local data closed-loop.

In a possible design, the first message includes a service identifier, and that the core network element determines, based on group information corresponding to the first terminal device, that the first terminal device needs to perform local routing includes:

The core network element determines, based on the group information corresponding to the first terminal device and the service identifier, that the first terminal device needs to perform local routing.

In a possible design, the service identifier includes the session ID of the first PDU session and/or a data network name (DNN), and that the core network element determines, based on the group information corresponding to the first terminal device and the service identifier, that the first terminal device needs to perform local routing includes:

The core network element determines, based on the group information corresponding to the first terminal device and the session ID of the first PDU session and/or the DNN, that the first terminal device needs to perform local routing.

In a possible design, the method further includes:

The core network element receives a group establishment request sent by an application function (AF) network element. The group establishment request includes the group ID.

The core network element stores the group ID in the group information.

In a possible design, the group establishment request further includes the group member list and/or a local routing node list.

In a possible design, the method further includes:

The core network element sends the local routing node list to the first access network node.

In a possible design, the group establishment request further includes a local switching indication, and the method further includes:

The core network element sends the local switching indication to the first access network node.

In a possible design, the method further includes:

The core network element receives a group modification request sent by an AF. The group modification request includes any one or more of the group ID, an updated group member list, an updated local routing node list, an updated local switching indication, and an updated service identifier.

The core network element updates the group information based on the group modification request.

The core network element obtains updated binding information. The updated binding information includes the group ID and session information of at least one updated PDU session.

The core network element sends the updated binding information to the first access network node.

The method provided in this implementation implements local route group modification.

In a possible design, the method further includes:

The core network element sends the updated local routing node list and/or the updated local switching indication to the first access network node.

In a possible design, the method further includes:

The core network element receives a group deletion request sent by an AF. The group deletion request includes the group ID that is requested to be deleted.

The core network element sends the group deletion request to the first access network node.

The core network element deletes the binding information after receiving acknowledgment information that is sent by the first access network node and that indicates that association information has been deleted. The association information includes the group ID and a local routing node list.

The core network element sends, to the AF, an acknowledgment message indicating that the binding information has been deleted.

The method provided in this implementation implements local route group deletion.

In a possible design, the method further includes:

The core network element receives a group information query request sent by an AF. The group information query request includes the group ID.

The core network element sends the group information and/or the binding information to the AF.

The method provided in this implementation implements local route group query.

In a possible design, the method further includes:

The core network element sends an association information request and/or a topology information request to the first access network node.

The core network element receives association information and topology information that are sent by the first access network node. The association information includes the group ID and a local routing node list.

The core network element sends the association information and/or the topology information to the AF.

According to a second aspect, this application provides a data transmission method. The method includes:

A first access network node receives binding information sent by a core network element. The binding information includes a group identifier ID and session information of a first protocol data unit PDU session, and the first PDU session is a session established by a first terminal device.

The first access network node selects a first local routing node based on the session information of the first PDU session and local routing node selection information. The first local routing node provides a local routing service for the first terminal device.

The first access network node sends first routing information to the first local routing node. The first routing information includes the group ID and an air interface identifier of the first terminal device, or the routing information includes the group ID, the air interface identifier of the first terminal device, and a local routing rule, the local routing rule is used to indicate the first local routing node to perform local routing, and the air interface identifier of the first terminal device is determined based on the session information of the first PDU session.

According to the data transmission method provided in the second aspect, after receiving the binding information sent by the core network element, the first access network node selects, based on the session information of the first PDU session and the local routing node selection information, the first local routing node that provides the local routing service for the first terminal device, and sends the first routing information to the first local routing node. The first local routing node may be an IAB node. Therefore, after receiving user plane data sent by the first terminal device, the first local routing node determines, based on the air interface identifier of the first terminal device, a group to which the first terminal device belongs, obtains the corresponding local routing rule through matching based on the group, and finally forwards the user plane data according to the local routing rule and a local switching indication. In this way, IAB based local routing can be implemented, so that user plane data can be directly forwarded inside an IAB node or between IAB nodes, and the data does not need to be transmitted to a donor node and a core network. This can shorten a transmission latency to a maximum extent, and implement local data closed-loop.

In a possible design, the binding information further includes session information of a second PDU session, the second PDU session is a session established by a second terminal device, and the method further includes:

The first access network node selects a second local routing node based on the session information of the first PDU session, the session information of the second PDU session, and the local routing node selection information. The second local routing node provides a local routing service for the second terminal device.

In a possible design, the binding information further includes session information of a second PDU session, the second PDU session is a session established by a second terminal device, and the method further includes:

The first access network node selects a second local routing node based on the first local routing node, the session information of the first PDU session, the session information of the second PDU session, and the local routing node selection information. The second local routing node provides a local routing service for the second terminal device.

In a possible design, the binding information further includes session information of a second PDU session, the second PDU session is a session established by a second terminal device, and that the first access network node selects a first local routing node based on the session information of the first PDU session and local routing node selection information includes:

The first access network node selects the first local routing node and a second local routing node based on the session information of the first PDU session, the session information of the second PDU session, and the local routing node selection information. The second local routing node provides a local routing service for the second terminal device.

In a possible design, the method further includes:

The first access network node sends second routing information to the second local routing node. The second routing information includes the group ID, the air interface identifier of the first terminal device, and an air interface identifier of the second terminal device, or the second routing information includes the group ID, the air interface identifier of the first terminal device, the air interface identifier of the second terminal device, and a local routing rule, and the local routing rule is used by the second local routing node to perform local routing.

In a possible design, the local routing node selection information includes one or more of topology information, a selection policy, configuration information, capability information, and a local routing node list sent by the core network element.

In a possible design, the method further includes:

The first access network node receives a local switching indication sent by the core network element. The first routing information further includes the local switching indication.

In a possible design, the method further includes:

The first access network node receives a group deletion request sent by the core network element. The group deletion request includes the group ID that is requested to be deleted.

The first access network node sends a local route deletion indication to the first local routing node. The local route deletion indication includes the group ID that is requested to be deleted.

The first access network node receives an acknowledgment message that is sent by the first local routing node and that indicates that a local route has been deleted.

The first access network node deletes association information. The association information includes the group ID and the local routing node list. In addition, the first access network node sends, to the core network element, acknowledgment information indicating that the association information has been deleted.

The method provided in this implementation implements local route group deletion.

In a possible design, the method further includes:

The first access network node receives a group deletion request sent by the core network element. The group deletion request includes the group ID that is requested to be deleted.

The first access network node sends a local route deletion indication to the first local routing node and/or the second local routing node. The local route deletion indication includes the group ID that is requested to be deleted.

The first access network node receives an acknowledgment message that is sent by the first local routing node and/or the second local routing node and that indicates that a local route has been deleted.

The first access network node deletes association information. The association information includes the group ID and the local routing node list. In addition, the first access network node sends, to the core network element, acknowledgment information indicating that the association information has been deleted.

The method provided in this implementation implements local route group deletion.

In a possible design, after the first access network node receives the binding information sent by the core network element, the method further includes:

The first access network node generates the local routing rule.

According to a third aspect, this application provides a data transmission method. The method includes:

A first local routing node receives routing information sent by a first access network node. The first routing information includes a group identifier (ID) and an air interface identifier of a first terminal device, or the routing information includes the group ID, the air interface identifier of the first terminal device, and a local routing rule, and the local routing rule is used to indicate the local routing node to perform local routing.

The first local routing node receives user plane data sent by the first terminal device.

The first local routing node determines, based on the air interface identifier of the first terminal device, a group to which the first terminal device belongs, and obtains the corresponding local routing rule through matching based on the group.

The first local routing node forwards the user plane data according to the local routing rule and a local switching indication.

According to the data transmission method provided in the third aspect, after receiving the user plane data sent by the first terminal device, the first local routing node determines, based on the air interface identifier of the first terminal device, the group to which the first terminal device belongs, obtains the corresponding local routing rule through matching based on the group, and finally forwards the user plane data according to the local routing rule and the local switching indication. In this way, IAB based local routing can be implemented, so that user plane data can be directly forwarded inside an IAB node or between IAB nodes, and the data does not need to be transmitted to a donor node and a core network. This can shorten a transmission latency to a maximum extent, and implement local data closed-loop.

In a possible design, the method further includes:

The first local routing node receives the local switching indication sent by the first access network node; and the first local routing node generates the local routing rule; or the first local routing node receives the local routing rule and the local switching indication that are sent by the first access network node.

In a possible design, the method further includes:

The first local routing node receives a local route deletion indication sent by the first access network node. The local route deletion indication carries the group ID that is requested to be deleted.

The first local routing node deletes the local routing rule corresponding to the group ID, and restores an initially configured routing rule.

The method provided in this implementation implements local route group deletion.

In a possible design, the local switching indication is an Ethernet layer switching indication or an internet protocol layer switching indication.

According to a fourth aspect, this application provides a data transmission method. The method includes:

An air node receives a first message sent by a first terminal device. The first message is used to request to establish a first protocol data unit (PDU) session.

The air node determines, based on group information corresponding to the first terminal device, that the first terminal device needs to perform local routing. The group information includes a group identifier (ID) and a group member list.

The air node obtains binding information. The binding information includes the group ID and session information of the first PDU session, and the session information includes one or more of a session ID, a tunnel endpoint identifier (TEID), and a flow identifier (QFIs) of the first PDU session.

The air node selects a first local routing node based on the session information of the first PDU session and local routing node selection information. The first local routing node provides a local routing service for the first terminal device.

The air node sends first routing information to the first local routing node. The first routing information includes the group ID and an air interface identifier of the first terminal device, or the routing information includes the group ID, the air interface identifier of the first terminal device, and a local routing rule, the local routing rule is used to indicate the first local routing node to perform local routing, and the air interface identifier of the first terminal device is determined based on the session information of the first PDU session.

According to the data transmission method provided in the fourth aspect, IAB based local routing can be implemented, so that user plane data can be directly forwarded inside an IAB node or between IAB nodes, and the data does not need to be transmitted to a donor node and a core network. This can shorten a transmission latency to a maximum extent, and implement local data closed-loop.

In a possible design, the first message includes a service identifier, and that the air node determines, based on group information corresponding to the first terminal device, that the first terminal device needs to perform local routing includes:

The air node determines, based on the group information corresponding to the first terminal device and the service identifier, that the first terminal device needs to perform local routing.

In a possible design, the service identifier includes the session ID of the first PDU session and/or a data network name DNN, and that the air node determines, based on the group information corresponding to the first terminal device and the service identifier, that the first terminal device needs to perform local routing includes:

The air node determines, based on the group information corresponding to the first terminal device and the session ID of the first PDU session and/or the DNN, that the first terminal device needs to perform local routing.

In a possible design, the method further includes:

The air node receives a group establishment request sent by a sink node. The group establishment request includes the group ID.

The air node stores the group ID in the group information.

In a possible design, the group establishment request further includes the group member list and/or a local routing node list.

In a possible design, the group establishment request further includes a local switching indication.

In a possible design, the binding information further includes session information of a second PDU session, the second PDU session is a session established by a second terminal device, and the method further includes:

The air node selects a second local routing node based on the session information of the first PDU session, the session information of the second PDU session, and the local routing node selection information. The second local routing node provides a local routing service for the second terminal device.

In a possible design, the binding information further includes session information of a second PDU session, the second PDU session is a session established by a second terminal device, and the method further includes:

The air node selects a second local routing node based on the first local routing node, the session information of the first PDU session, the session information of the second PDU session, and the local routing node selection information. The second local routing node provides a local routing service for the second terminal device.

In a possible design, the binding information further includes session information of a second PDU session, the second PDU session is a session established by a second terminal device, and that the air node selects a first local routing node based on the session information of the first PDU session and local routing node selection information includes:

The air node selects the first local routing node and a second local routing node based on the session information of the first PDU session, the session information of the second PDU session, and the local routing node selection information. The second local routing node provides a local routing service for the second terminal device.

In a possible design, the method further includes:

The air node sends second routing information to the second local routing node. The second routing information includes the group ID, the air interface identifier of the first terminal device, and an air interface identifier of the second terminal device, or the second routing information includes the group ID, the air interface identifier of the first terminal device, the air interface identifier of the second terminal device, and a local routing rule, and the local routing rule is used by the second local routing node to perform local routing.

In a possible design, the local routing node selection information includes one or more of topology information, a selection policy, configuration information, capability information, and a local routing node list sent by the sink node.

In a possible design, the method further includes:

The air node receives a group modification request sent by a sink node. The group modification request includes any one or more of the group ID, an updated group member list, an updated local routing node list, an updated local switching indication, and an updated service identifier.

The air node updates the group information based on the group modification request.

The air node obtains updated binding information. The updated binding information includes the group ID and session information of at least one updated PDU session.

In a possible design, the group modification request further includes the updated local routing node list and/or the updated local switching indication.

In a possible design, the method further includes:

The air node receives a group deletion request sent by a sink node. The group deletion request includes the group ID that is requested to be deleted.

The air node sends a local route deletion indication to the first local routing node and/or a second local routing node. The local route deletion indication includes the group ID that is requested to be deleted.

The air node receives an acknowledgment message that is sent by the first local routing node and/or the second local routing node and that indicates that a local route has been deleted.

The air node deletes association information. The association information includes the group ID and a local routing node list.

The air node deletes the binding information.

The air node sends, to the sink node, an acknowledgment message indicating that the binding information has been deleted.

In a possible design, the method further includes:

The air node receives a group information query request sent by a sink node. The group information query request includes the group ID.

The air node sends the group information or one or more of the group information, the binding information, association information, and topology information to the sink node.

According to a fifth aspect, this application provides a data transmission method. The method includes:

A first local routing node receives routing information sent by an air node. The first routing information includes a group identifier ID and an air interface identifier of a first terminal device, or the routing information includes the group ID, the air interface identifier of the first terminal device, and a local routing rule, and the local routing rule is used to indicate the local routing node to perform local routing.

The first local routing node receives user plane data sent by the first terminal device.

The first local routing node determines, based on the air interface identifier of the first terminal device, a group to which the first terminal device belongs, and obtains the corresponding local routing rule through matching based on the group.

The first local routing node forwards the user plane data according to the local routing rule and a local switching indication.

In a possible design, the method further includes:

The first local routing node receives the local switching indication sent by the air node; and
  the first local routing node generates the local routing rule; or
  the first local routing node receives the local routing rule and the local switching indication that are sent by the air node.

In a possible design, the method further includes:

The first local routing node receives a local route deletion indication sent by the air node. The local route deletion indication carries the group ID that is requested to be deleted.

The first local routing node deletes the local routing rule corresponding to the group ID, and restores an initially configured routing rule.

In a possible design, the local switching indication is an Ethernet layer switching indication or an internet protocol layer switching indication.

According to a sixth aspect, this application provides a data transmission apparatus. The apparatus includes:
  a receiving module, configured to receive a first message sent by a first terminal device, where the first message is used to request to establish a first protocol data unit PDU session;
  a determining module, configured to determine, based on group information corresponding to the first terminal device, that the first terminal device needs to perform local routing, where the group information includes a group identifier ID and a group member list;
  a processing module, configured to obtain binding information, where the binding information includes the group ID and session information of the first PDU session, and the session information includes one or more of a session ID, a tunnel endpoint identifier TEID, and a flow identifier QFIs of the first PDU session; and
  a sending module, configured to send the binding information to a first access network node.

In a possible design, the first message includes a service identifier, and the determining module is configured to:
  determine, based on the group information corresponding to the first terminal device and the service identifier, that the first terminal device needs to perform local routing.

In a possible design, the service identifier includes the session ID of the first PDU session and/or a data network name DNN, and the determining module is configured to:
  determine, based on the group information corresponding to the first terminal device and the session ID of the first PDU session and/or the DNN, that the first terminal device needs to perform local routing.

In a possible design, the receiving module is further configured to receive a group establishment request sent by an application function AF network element, where the group establishment request includes the group ID.

The processing module is further configured to store the group ID in the group information.

In a possible design, the group establishment request further includes the group member list and/or a local routing node list.

In a possible design, the sending module is further configured to:
  send the local routing node list to the first access network node.

In a possible design, the group establishment request further includes a local switching indication, and the sending module is further configured to:
  send the local switching indication to the first access network node.

In a possible design, the receiving module is further configured to receive a group modification request sent by an AF, where the group modification request includes any one or more of the group ID, an updated group member list, an updated local routing node list, an updated local switching indication, and an updated service identifier.

The processing module is further configured to: update the group information based on the group modification request; and obtain updated binding information, where the updated binding information includes the group ID and session information of at least one updated PDU session.

The sending module is further configured to send the updated binding information to the first access network node.

In a possible design, the sending module is further configured to:
  send the updated local routing node list and/or the updated local switching indication to the first access network node.

In a possible design, the receiving module is further configured to receive a group deletion request sent by an AF, where the group deletion request includes the group ID that is requested to be deleted.

The sending module is further configured to send the group deletion request to the first access network node.

The processing module is further configured to delete the binding information after the receiving module receives acknowledgment information that is sent by the first access network node and that indicates that association information has been deleted, where the association information includes the group ID and a local routing node list.

The sending module is further configured to send, to the AF, an acknowledgment message indicating that the binding information has been deleted.

In a possible design, the receiving module is further configured to receive a group information query request sent by an AF, where the group information query request includes the group ID.

The sending module is further configured to send the group information and/or the binding information to the AF.

In a possible design, the sending module is further configured to send an association information request and/or a topology information request to the first access network node.

The receiving module is further configured to receive association information and topology information that are sent by the first access network node, where the association information includes the group ID and a local routing node list.

The sending module is further configured to send the association information and/or the topology information to the AF.

For beneficial effects of the data transmission apparatus provided in the sixth aspect and the possible designs of the sixth aspect, refer to the beneficial effects brought by the first aspect and the possible implementations of the first aspect. Details are not described herein again.

According to a seventh aspect, this application provides a data transmission apparatus. The apparatus includes:

a receiving module configured to receive binding information sent by a core network element, where the binding information includes a group identifier (ID) and session information of a first protocol data unit (PDU) session, and the first PDU session is a session established by a first terminal device;

a processing module configured to select a first local routing node based on the session information of the first PDU session and local routing node selection information, where the first local routing node provides a local routing service for the first terminal device; and a sending module configured to send first routing information to the first local routing node, where the first routing information includes the group ID and an air interface identifier of the first terminal device, or the routing information includes the group ID, the air interface identifier of the first terminal device, and a local routing rule, the local routing rule is used to indicate the first local routing node to perform local routing, and the air interface identifier of the first terminal device is determined based on the session information of the first PDU session.

In a possible design, the binding information further includes session information of a second PDU session, the second PDU session is a session established by a second terminal device, and the selection module is configured to:

select a second local routing node based on the session information of the first PDU session, the session information of the second PDU session, and the local routing node selection information, where the second local routing node provides a local routing service for the second terminal device.

In a possible design, the binding information further includes session information of a second PDU session, the second PDU session is a session established by a second terminal device, and the selection module is configured to:

select a second local routing node based on the first local routing node, the session information of the first PDU session, the session information of the second PDU session, and the local routing node selection information, where the second local routing node provides a local routing service for the second terminal device.

In a possible design, the binding information further includes session information of a second PDU session, the second PDU session is a session established by a second terminal device, and the selection module is configured to:

select the first local routing node and a second local routing node based on the session information of the first PDU session, the session information of the second PDU session, and the local routing node selection information, where the second local routing node provides a local routing service for the second terminal device.

In a possible design, the sending module is further configured to:

send second routing information to the second local routing node, where the second routing information includes the group ID, the air interface identifier of the first terminal device, and an air interface identifier of the second terminal device, or the second routing information includes the group ID, the air interface identifier of the first terminal device, the air interface identifier of the second terminal device, and a local routing rule, and the local routing rule is used by the second local routing node to perform local routing.

In a possible design, the local routing node selection information includes one or more of topology information, a selection policy, configuration information, capability information, and a local routing node list sent by the core network element.

In a possible design, the receiving module is further configured to:

receive a local switching indication sent by the core network element, where the first routing information further includes the local switching indication.

In a possible design, the receiving module is further configured to:

receive a group deletion request sent by the core network element, where the group deletion request includes the group ID that is requested to be deleted.

The sending module is further configured to send a local route deletion indication to the first local routing node, where the local route deletion indication includes the group ID that is requested to be deleted.

The receiving module is further configured to receive an acknowledgment message that is sent by the first local routing node and that indicates that a local route has been deleted.

The processing module is further configured to delete association information, where the association information includes the group ID and the local routing node list.

The sending module is further configured to send, to the core network element, acknowledgment information indicating that the association information has been deleted.

In a possible design, the receiving module is further configured to receive a group deletion request sent by the core network element, where the group deletion request includes the group ID that is requested to be deleted.

The sending module is further configured to send a local route deletion indication to the first local routing node and/or the second local routing node, where the local route deletion indication includes the group ID that is requested to be deleted.

The receiving module is further configured to receive an acknowledgment message that is sent by the first local routing node and/or the second local routing node and that indicates that a local route has been deleted.

The processing module is further configured to delete association information, where the association information includes the group ID and the local routing node list.

The sending module is further configured to send, to the core network element, acknowledgment information indicating that the association information has been deleted.

In a possible design, the processing module is further configured to generate the local routing rule after the receiving module receives the binding information sent by the core network element.

For beneficial effects of the data transmission apparatus provided in the seventh aspect and the possible designs of the seventh aspect, refer to the beneficial effects brought by the second aspect and the possible implementations of the second aspect. Details are not described herein again.

According to an eighth aspect, this application provides a data transmission apparatus. The apparatus includes a receiving module, a processing module, and a sending module.

The receiving module is configured to receive routing information sent by a first access network node, where the first routing information includes a group identifier ID and an air interface identifier of a first terminal device, or the routing information includes the group ID, the air interface identifier of the first terminal device, and a local routing rule, and the local routing rule is used to indicate the local routing node to perform local routing.

The receiving module is further configured to receive user plane data sent by the first terminal device.

The processing module is configured to: determine, based on the air interface identifier of the first terminal device, a group to which the first terminal device belongs, and obtain the corresponding local routing rule through matching based on the group.

The sending module is configured to forward the user plane data according to the local routing rule and a local switching indication.

In a possible design, the receiving module is further configured to receive the local switching indication sent by the first access network node; and the processing module is further configured to generate the local routing rule; or the receiving module is further configured to receive the local routing rule and the local switching indication that are sent by the first access network node.

In a possible design, the receiving module is further configured to receive a local route deletion indication sent by the first access network node, where the local route deletion indication carries the group ID that is requested to be deleted.

The processing module is further configured to: delete the local routing rule corresponding to the group ID, and restore an initially configured routing rule.

In a possible design, the local switching indication is an Ethernet layer switching indication or an internet protocol layer switching indication.

For beneficial effects of the data transmission apparatus provided in the eighth aspect and the possible designs of the eighth aspect, refer to the beneficial effects brought by the third aspect and the possible implementations of the third aspect. Details are not described herein again.

According to a ninth aspect, this application provides a data transmission apparatus. The apparatus includes a receiving module, a determining module, a processing module, and a sending module.

The receiving module is configured to receive a first message sent by a first terminal device, where the first message is used to request to establish a first protocol data unit (PDU) session.

The determining module is configured to determine, based on group information corresponding to the first terminal device, that the first terminal device needs to perform local routing, where the group information includes a group identifier (ID) and a group member list.

The processing module is configured to obtain binding information, where the binding information includes the group ID and session information of the first PDU session, and the session information includes one or more of a session ID, a tunnel endpoint identifier TEID, and a flow identifier (QFIs) of the first PDU session.

The processing module is further configured to select a first local routing node based on the session information of the first PDU session and local routing node selection information, where the first local routing node provides a local routing service for the first terminal device.

The sending module is configured to send first routing information to the first local routing node, where the first routing information includes the group ID and an air interface identifier of the first terminal device, or the routing information includes the group ID, the air interface identifier of the first terminal device, and a local routing rule, the local routing rule is used to indicate the first local routing node to perform local routing, and the air interface identifier of the first terminal device is determined based on the session information of the first PDU session.

In a possible design, the first message includes a service identifier, and the determining module is configured to:
  determine, based on the group information corresponding to the first terminal device and the service identifier, that the first terminal device needs to perform local routing.

In a possible design, the service identifier includes the session ID of the first PDU session and/or a data network name DNN, and the determining module is configured to: determine, based on the group information corresponding to the first terminal device and the session ID of the first PDU session and/or the DNN, that the first terminal device needs to perform local routing.

In a possible design, the receiving module is further configured to receive a group establishment request sent by a sink node, where the group establishment request includes the group ID.

The processing module is further configured to store the group ID in the group information.

In a possible design, the group establishment request further includes the group member list and/or a local routing node list.

In a possible design, the group establishment request further includes a local switching indication.

In a possible design, the binding information further includes session information of a second PDU session, the second PDU session is a session established by a second terminal device, and the processing module is configured to:

select a second local routing node based on the session information of the first PDU session, the session information of the second PDU session, and the local routing node selection information, where the second local routing node provides a local routing service for the second terminal device.

In a possible design, the binding information further includes session information of a second PDU session, the second PDU session is a session established by a second terminal device, and the processing module is configured to: select a second local routing node based on the first local routing node, the session information of the first PDU session, the session information of the second PDU session, and the local routing node selection information, where the second local routing node provides a local routing service for the second terminal device.

In a possible design, the binding information further includes session information of a second PDU session, the second PDU session is a session established by a second terminal device, and the processing module is configured to: select the first local routing node and a second local routing node based on the session information of the first PDU session, the session information of the second PDU session, and the local routing node selection information, where the second local routing node provides a local routing service for the second terminal device.

In a possible design, the sending module is further configured to send second routing information to the second local routing node, where the second routing information includes the group ID, the air interface identifier of the first terminal device, and an air interface identifier of the second terminal device, or the second routing information includes the group ID, the air interface identifier of the first terminal device, the air interface identifier of the second terminal device, and a local routing rule, and the local routing rule is used by the second local routing node to perform local routing.

In a possible design, the local routing node selection information includes one or more of topology information, a selection policy, configuration information, capability information, and a local routing node list sent by the sink node.

In a possible design, the receiving module is further configured to receive a group modification request sent by a sink node, where the group modification request includes any one or more of the group ID, an updated group member list, an updated local routing node list, an updated local switching indication, and an updated service identifier.

The processing module is further configured to: update the group information based on the group modification request; and obtain updated binding information, where the updated binding information includes the group ID and session information of at least one updated PDU session.

In a possible design, the receiving module is further configured to receive a group deletion request sent by a sink node, where the group deletion request includes the group ID that is requested to be deleted.

The sending module is further configured to send a local route deletion indication to the first local routing node and/or a second local routing node, where the local route deletion indication includes the group ID that is requested to be deleted.

The receiving module is further configured to receive an acknowledgment message that is sent by the first local routing node and/or the second local routing node and that indicates that a local route has been deleted.

The processing module is further configured to: delete association information, where the association information includes the group ID and a local routing node list; and delete the binding information.

The sending module is further configured to send, to the sink node, an acknowledgment message indicating that the binding information has been deleted.

In a possible design, the receiving module is further configured to receive a group information query request sent by a sink node, where the group information query request includes the group ID.

The sending module is further configured to send the group information or one or more of the group information, the binding information, association information, and topology information to the sink node.

For beneficial effects of the data transmission apparatus provided in the ninth aspect and the possible designs of the ninth aspect, refer to the beneficial effects brought by the fourth aspect and the possible implementations of the fourth aspect. Details are not described herein again.

According to a tenth aspect, this application provides a data transmission apparatus. The apparatus includes a receiving module, a processing module, and a sending module.

The receiving module is configured to receive routing information sent by an air node, where the first routing information includes a group identifier (ID) and an air interface identifier of a first terminal device, or the routing information includes the group ID, the air interface identifier of the first terminal device, and a local routing rule, and the local routing rule is used to indicate the local routing node to perform local routing.

The receiving module is further configured to receive user plane data sent by the first terminal device.

The processing module is configured to: determine, based on the air interface identifier of the first terminal device, a group to which the first terminal device belongs, and obtain the corresponding local routing rule through matching based on the group.

The sending module is configured to forward the user plane data according to the local routing rule and a local switching indication.

In a possible design, the receiving module is further configured to receive the local switching indication sent by the air node; and the processing module is further configured to generate the local routing rule; or the receiving module is further configured to receive the local routing rule and the local switching indication that are sent by the air node.

In a possible design, the receiving module is further configured to receive a local route deletion indication sent by the air node, where the local route deletion indication carries the group ID that is requested to be deleted.

The processing module is further configured to: delete the local routing rule corresponding to the group ID, and restore an initially configured routing rule.

In a possible design, the local switching indication is an Ethernet layer switching indication or an internet protocol layer switching indication.

For beneficial effects of the data transmission apparatus provided in the tenth aspect and the possible designs of the tenth aspect, refer to the beneficial effects brought by the fifth aspect and the possible implementations of the fifth aspect. Details are not described herein again.

According to an eleventh aspect, this application provides a data transmission apparatus. The apparatus includes a memory and a processor.

The memory is configured to store instructions. When the apparatus runs, the processor executes the instructions stored in the memory, so that the apparatus performs the data transmission method according to any one of the first aspect and the possible designs of the first aspect, or according to any one of the second aspect and the possible designs of the second aspect, or according to any one of the third aspect and the possible designs of the third aspect, or according to any one of the fourth aspect and the possible designs of the fourth aspect, or according to any one of the fifth aspect and the possible designs of the fifth aspect. It should be noted that the memory may be integrated into the processor, or may be independent of the processor.

According to a twelfth aspect, this application provides an apparatus. The apparatus includes a processor. The processor is configured to be coupled to a memory, read instructions in the memory, and perform the data transmission method according to any one of the first aspect and the possible designs of the first aspect, or according to any one of the second aspect and the possible designs of the second aspect, or according to any one of the third aspect and the possible designs of the third aspect, or according to any one of the fourth aspect and the possible designs of the fourth aspect, or according to any one of the fifth aspect and the possible designs of the fifth aspect.

According to a thirteenth aspect, this application provides an apparatus. The apparatus may be a chip or a circuit. The apparatus has functions of implementing the embodiments and the data transmission method according to any one of the first aspect and the possible designs of the first aspect, or according to any one of the second aspect and the possible designs of the second aspect, or according to any one of the third aspect and the possible designs of the third aspect, or according to any one of the fourth aspect and the possible designs of the fourth aspect, or according to any one of the fifth aspect and the possible designs of the fifth aspect. The functions may be implemented by hardware, or may be implemented by hardware executing corresponding software. The hardware or the software includes one or more modules corresponding to the functions.

According to a fourteenth aspect, this application provides a readable storage medium. The readable storage medium stores executable instructions. When at least one processor in a data transmission apparatus executes the executable instructions, the data transmission apparatus performs the data transmission method according to any one of the first aspect and the possible designs of the first aspect, or according to any one of the second aspect and the possible designs of the second aspect, or according to any one of the third aspect and the possible designs of the third aspect, or according to any one of the fourth aspect and the possible designs of the fourth aspect, or according to any one of the fifth aspect and the possible designs of the fifth aspect.

According to a fifteenth aspect, this application further provides a computer program product including instructions. When the computer program product runs on a computer, the computer is enabled to perform the data transmission method according to any one of the foregoing aspects.

According to a sixteenth aspect, this application further provides a system. The system includes one or more of a core network element, a first access network node, and a first local routing node.

The core network element may be configured to perform the method according to any one of the first aspect and the possible designs of the first aspect or perform steps performed by the core network element in the solutions provided in the embodiments of this application. The first access network node may be configured to perform the method according to any one of the second aspect and the possible designs of the second aspect or perform steps performed by the first access network node in the solutions provided in the embodiments of this application. The first local routing node may be configured to perform the method according to any one of the third aspect and the possible designs of the third aspect or perform steps performed by the first access network node in the solutions provided in the embodiments of this application.

In a possible design, the system may further include another device that interacts with the foregoing network elements in the solutions provided in the embodiments of this application, for example, an air node or a terminal device.

DESCRIPTION OF EMBODIMENTS

In embodiment of this application, a word such as "example" or "for example" is used to indicate an example, an instance, or a description. Any embodiment or solution described as "example" or "for example" in embodiments of this application is not to be construed as being more preferred or advantageous than other embodiments or solutions. Exactly, use of the word such as "example" or "for example" is intended to present a related concept in a specific manner.

In this application, "at least one" means one or more, and "a plurality of" means two or more. In addition, "and/or" describes an association relationship between associated objects, and indicates that three relationships may exist. For example, A and/or B may indicate the following cases: Only A exists, both A and B exist, and only B exists, where A and B may be singular or plural. A character "/" usually indicates an "or" relationship between the associated objects. In addition, terms "first" and "second" are merely used for a purpose of description, and shall not be understood as an indication or implication of relative importance.

Figure 1:
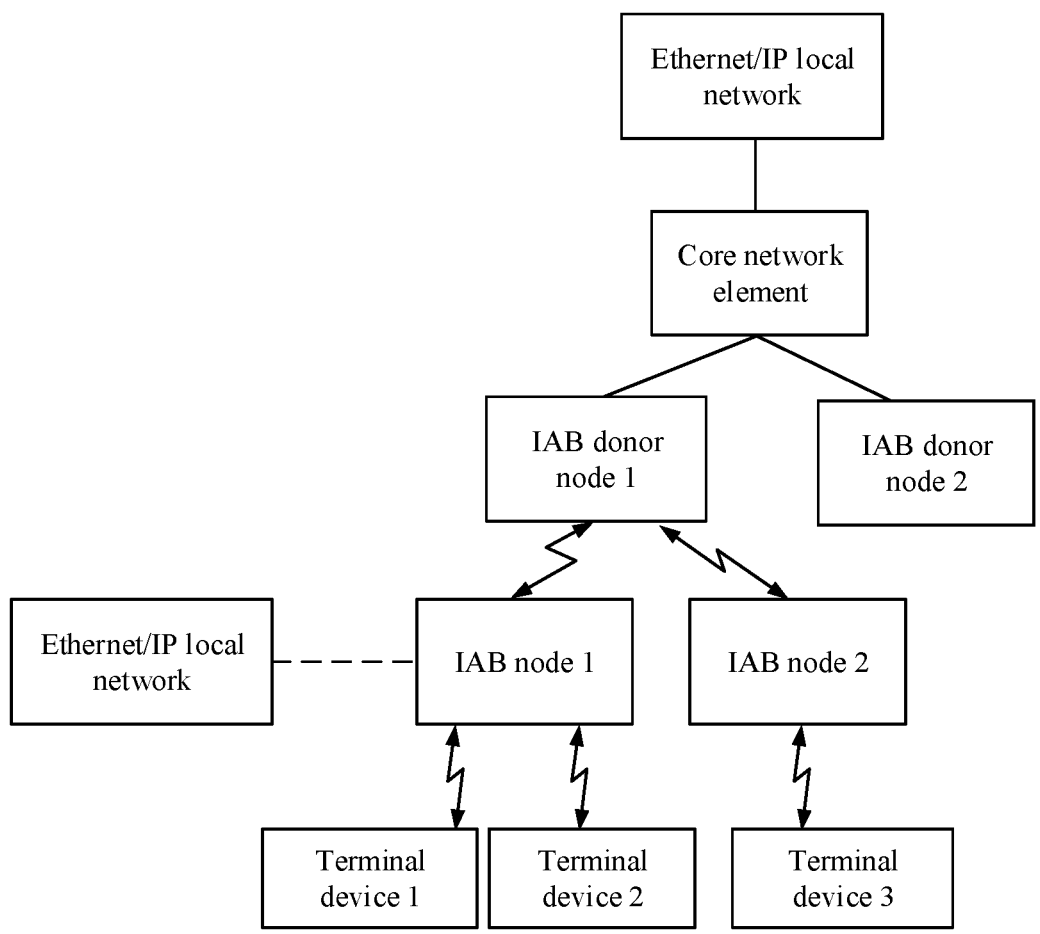
FIG. 1 is a schematic diagram of a system architecture in this application.

FIG. 1 is a schematic diagram of a system architecture in this application. As shown in FIG. 1, the system architecture includes an IAB node, an IAB donor node, a CN, and an Ethernet/internet (IP) local network. The IAB node has a centralized unit-user plane (CU-UP) capability, in other words, has a protocol stack of a packet data convergence protocol (PDCP) and a service data adaptation protocol (SDAP). If there is an interface, the IAB node may directly forward user plane data to the Ethernet or IP local network. The IAB donor node is responsible for managing all IAB nodes, and can learn of a topology relationship between IAB nodes/terminal devices. Function network element distribution on a CN side is the same as that in an existing standard. The Ethernet/IP local network may be an industrial Ethernet data network or an IP data network based on different services.

It should be noted that embodiments of this application are not limited to the foregoing system architecture, and may alternatively be applied to another future communications system, for example, a sixth generation communications (6G) system architecture. In addition, in embodiments of this application, names of the foregoing used network elements may be changed while functions of the network elements may remain the same in a future communications system.

In addition, although not shown in FIG. 1, the communications system may further include another network element, device, network entity, network subsystem, or the like. Details are not described in embodiments of this application.

It should be noted that the foregoing network elements may be different communications devices, or may be different communications apparatuses, modules, or subsystems in a same communications device. This is not limited in embodiments of this application.

Optionally, each network element, network device, or terminal device in embodiments of this application may also be referred to as a communications apparatus. The communications apparatus may be a general-purpose device or a special-purpose device. This is not specifically limited in embodiments of this application.

Optionally, a related function of the policy control network element or the network device in embodiments of this application may be implemented by one device, or may be jointly implemented by a plurality of devices, or may be implemented by one or more function modules in one device. This is not specifically limited in embodiments of this application. It may be understood that the foregoing function may be a network element in a hardware device, or a software function running on special-purpose hardware, or a combination of hardware and software, or a virtualization function instantiated on a platform (for example, a cloud platform).

In embodiments of this application, the terminal device may be a wireless terminal, and the wireless terminal may be a device that provides a user with voice and/or connectivity of other service data, for example, a handheld device having a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone) and a computer having a mobile terminal, for example, may be a portable, pocket-sized, handheld, computer built-in, or vehicle-mounted mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, or a user device or user equipment. This is not limited herein.

In a data transmission solution based on an IAB architecture in a related technology, user plane data of each terminal device needs to be routed to an IAB donor node, and is transmitted by the LAB donor node to a data network through a core network. In this case, the user plane data of the terminal device needs to pass through a multi-hop IAB node, the IAB donor node, and a core network user plane anchor to reach the data network. Consequently, a transmission latency is relatively long. To resolve this problem, this application provides a data transmission method and apparatus, to implement IAB based local routing, so that user plane data can be directly forwarded inside an IAB node or between IAB nodes, and the data does not need to be transmitted to the IAB donor node and the core network. This can shorten a transmission latency to a maximum extent, and implement local data closed-loop. The following describes in detail a specific process of the data transmission method provided in this application with reference to the accompanying drawings.

Figure 2:
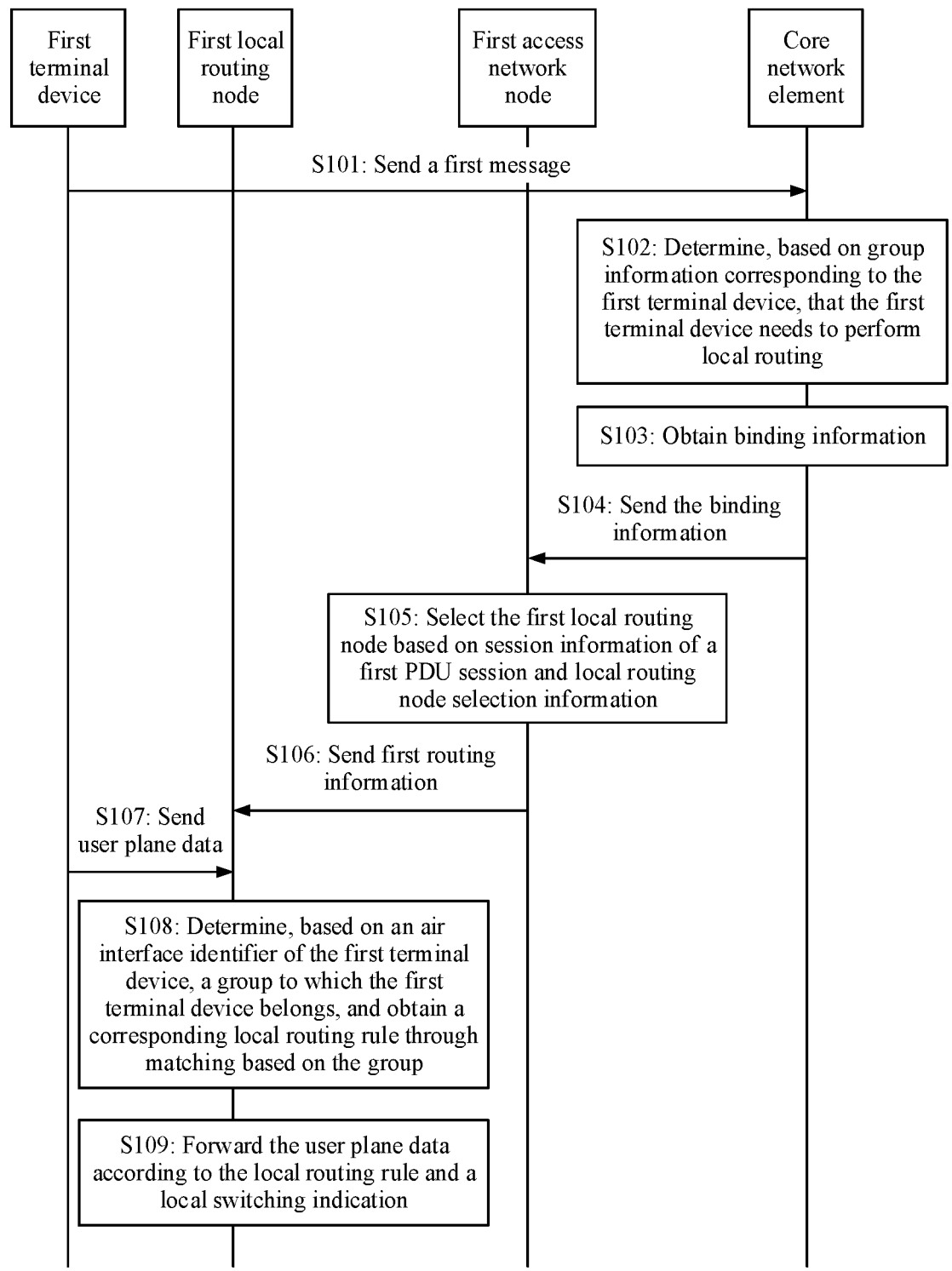
FIG. 2 is an interaction flowchart of an embodiment of a data transmission method according to this application.

FIG. 2 is an interaction flowchart of an embodiment of a data transmission method according to this application. As shown in FIG. 2, the method in this embodiment may include the following steps.

S101: A core network element receives a first message sent by a first terminal device, where the first message is used to request to establish a first protocol data unit (PDU) session.

Optionally, the first message includes a service identifier. The service identifier may include a session ID of the first PDU session and/or a data network name (DNN), and the DNN identifies a service type of a terminal device. In other words, the service identifier may be represented by the session ID of the first PDU session, or may be represented by the DNN, or may be represented by both the session ID of the first PDU session and the DNN. Specifically, a session ID of a PDU session is generated by the terminal device. If it is specified in advance that session ID sequence numbers of PDU sessions in different ranges indicate different services, after the terminal device adds a session ID in a specific sequence number range, a network side can identify a service type. Therefore, the session ID of the first PDU session may be used as the service identifier.

S102: The core network element determines, based on group information corresponding to the first terminal device, that the first terminal device needs to perform local routing, where the group information includes a group identifier (ID) and a group member list. The group member list may be a list including a plurality of group member IDs. In a possible implementation, when the first message includes the service identifier, S102 may be specifically: The core network element determines, based on the group information corresponding to the first terminal device and the service identifier that the first terminal device needs to perform local routing.

Further, when the service identifier includes the session ID of the first PDU session and/or the DNN, that the core network element determines, based on the group information corresponding to the first terminal device and the service identifier, that the first terminal device needs to perform local routing may be specifically: The core network element determines, based on the group information corresponding to the first terminal device and the session ID of the first PDU session and/or the DNN, that the first terminal device needs to perform local routing. That the core network element determines, based on the group information corresponding to the first terminal device and the session ID of the first PDU session, that the first terminal device needs to perform local routing may be specifically: if the group information includes a service identifier that may be identified by a session ID, a DNN, or both, and when a terminal ID is a group member, and the session ID of the first PDU matches a service identifier in a group, performing local routing based on the group.

That the core network element determines, based on the group information corresponding to the first terminal device and the DNN, that the first terminal device needs to perform local routing may be specifically: if the group information includes a service identifier that may be identified by a session ID, a DNN, or both, and when a terminal ID is a group member, and the DNN carried in the first message matches a service identifier in a group, performing local routing based on the group.

That the core network element determines, based on the group information corresponding to the first terminal device, the session ID of the first PDU session, and the DNN, that the first terminal device needs to perform local routing may be specifically: if the group information includes a service identifier that may be identified by a session ID, a DNN, or both, when a terminal ID is a group member, and the DNN and the session ID that are carried in the first message matches a service identifier in a group, performing local routing based on the group. When the first message does not carry the service identifier or group information corresponding to a terminal does not include service information, it is considered by default that all terminal devices in the group support only or have a unique data service.

S103: The core network element obtains binding information, where the binding information includes the group ID and session information of the first PDU session, and the session information includes one or more of the session ID, a tunnel endpoint identifier (TEID), and a flow identifier (QoS Flow Identifier, QFIs) of the first PDU session.

The first terminal device may correspond to a plurality of pieces of group information, and the group information corresponding to the first terminal device includes a packet service identifier. When the service identifier in the first message matches the packet service identifier, it is determined that local routing needs to be performed. The session information is also bound to the service identifier.

Specifically, when determining, based on the group information corresponding to the first terminal device, that the first terminal device needs to perform local routing, the core network element obtains a binding relationship between the group ID and the session information of the first PDU session, to obtain the binding information.

S104: The core network element sends the binding information to a first access network node.

The first access network node may be an IAB donor node. Herein, it may be further supplemented that the first access network node may be a RAN node of another type or form, for example, a gNB (next generation NB), eNB (evolved NB) or an ng-eNB (next generation eNB).

In this embodiment, optionally, before S101, the method may further include: The core network element receives a group establishment request sent by an application function (AF) network element. The group establishment request includes the group ID. The core network element stores the group ID in the group information.

Optionally, the group establishment request further includes the group member list and/or a local routing node list. In other words, the group establishment request may further include the group member list; or the group establishment request may further include the local routing node list, and the local routing node list is one or more specified local routing nodes used by the terminal device to perform local routing; or the group establishment request may further include the group member list and the local routing node list. If the group establishment request does not include the group member list, the group member list may be preconfigured in the core network element.

When the group establishment request includes the local routing node list, or includes the group member list and the local routing node list, the method in this embodiment may further include: The core network element sends the local routing node list to the first access network node. The local routing node list is used as a selection for the core network element to select a final local routing node list. Optionally, the local routing node list may also be preconfigured in the core network element. The local routing node list may include one or more local routing nodes, and the selected final local routing node list may also include one or more local routing nodes.

Optionally, the group establishment request may further include a local switching indication, and the local switching indication is an Ethernet layer switching indication or an internet protocol layer switching indication. Accordingly, the method in this embodiment may further include: The core network element sends the local switching indication to the first access network node. The core network element may send the local switching indication to the first access network node when the binding information is sent in S104, or may send the local switching indication to the first access network node before or after the binding information is sent.

S105: The first access network node selects a first local routing node based on the session information of the first PDU session and local routing node selection information, where the first local routing node provides a local routing service for the first terminal device.

Specifically, after the first access network node receives the binding information sent by the core network element, the binding information includes the group ID and the session information of the first PDU session. After receiving the binding information sent by the core network element, the first access network node selects, based on the session information of the first PDU session and the local routing node selection information, the first local routing node that provides the local routing service for the first terminal device. The local routing node selection information includes one or more of topology information, a selection policy, configuration information, capability information, and a local routing node list sent by the core network element. Specifically, if the first access network node is an IAB donor node, the IAB donor node can learn of a hierarchical relationship between an IAB node managed by the IAB donor node and a terminal device. Specifically, if the IAB node is constructed in a form of a spanning tree, the IAB donor node can obtain identifiers and locations of each branch and each leaf node device in the spanning tree (ST). The leaf node may be a terminal device or an IAB node. If the IAB node is constructed in a form of a directed acyclic graph (DAG), the IAB donor node can obtain device identifiers and locations of each edge and vertex in the graph. The vertex may be a terminal device or an IAB node.

In a possible implementation, the selecting a first local routing node based on the session information of the first PDU session and local routing node selection information may be specifically: The IAB donor node stores a mapping relationship between an air interface bearer (DRB ID identifier) and a QoS flow (QFI). After obtaining the session information in the binding information, the IAB donor node obtains, based on the mapping relationship between a DRB and a QoS flow, a group member list (in a form of a DRB ID list) on which local routing needs to be performed, and then selects an appropriate local routing node based on a location of a group member in a topology, the selection policy, the configuration information, and capability information of an IAB node in the topology. The IAB donor node may select a plurality of local routing nodes based on different group member distribution. When the binding information includes session information of at least two PDU sessions, the first access network node selects a local routing node based on the binding information and the local routing node selection information in the following three possible implementations in this embodiment.

Manner 1: The binding information that is sent by the core network element and that is received by the first access network node further includes session information of a second PDU session, and the second PDU session is a session established by a second terminal device. The method in this embodiment may further include: The first access network node selects a second local routing node based on the session information of the first PDU session, the session information of the second PDU session, and the local routing node selection information. The second local routing node provides a local routing service for the second terminal device. The second local routing node and the first local routing node may be the same. In other words, one local routing node serves a plurality of terminal devices.

Manner 2: In an optional embodiment, the binding information that is sent by the core network element and that is received by the first access network node further includes session information of a second PDU session, and the second PDU session is a session established by a second terminal device. The method in this embodiment may further include: The first access network node selects a second local routing node based on the first local routing node, the session information of the first PDU session, the session information of the second PDU session, and the local routing node selection information. The second local routing node provides a local routing service for the second terminal device. The second local routing node and the first local routing node may be the same. In other words, one local routing node serves a plurality of terminal devices.

Manner 3: The binding information that is sent by the core network element and that is received by the first access network node further includes session information of a second PDU session, and the second PDU session is a session established by a second terminal device. In this case, S105 may be specifically: The first access network node selects the first local routing node and a second local routing node based on the session information of the first PDU session, the session information of the second PDU session, and the local routing node selection information. The second local routing node provides a local routing service for the second terminal device.

An example in which the binding information includes session information of at least two PDU sessions is used for description above. The foregoing manner is also applicable to a scenario in which the binding information includes session information of more than two PDU sessions. Manner 3 is used as an example. It is assumed that the binding information includes session information of a plurality of PDU sessions, for example, the binding information includes the session information of the first PDU session, the session information of the second PDU session, . . . , and session information of an $N^{th}$ PDU session; and the first PDU session is a session established by the first terminal device, the second PDU session is a session established by the second terminal device, and the $N^{th}$ PDU session is a session established by an $N^{th}$ terminal device. In this case, the first access network node selects, based on the session information of the first PDU session, the session information of the second PDU session, . . . , and the session information of the Nt PDU session, and the local routing node selection information, local routing nodes that respectively provide local routing services for the first terminal device, the second terminal device, . . . , and the $N^{th}$ terminal device. The N terminal devices may correspond to one or more local routing nodes.

S106: The first access network node sends first routing information to the first local routing node, where the first routing information includes the group ID and an air interface identifier of the first terminal device, or the routing information includes the group ID, the air interface identifier of the first terminal device, and a local routing rule, the local routing rule is used to indicate the first local routing node to perform local routing, and the air interface identifier of the first terminal device is determined based on the session information of the first PDU session.

Specifically, the session information of the first PDU session includes the one or more of the session ID, the tunnel endpoint identifier TEID, and the flow identifier QFIs of the first PDU session. A possible implementation of determining the air interface identifier of the first terminal device based on the session information of the first PDU session may be: The IAB donor node stores the mapping relationship between an air interface bearer (DRB ID identifier) and a QoS flow (QFI). After obtaining the session information in the binding information, the IAB donor node may obtain the air interface identifier based on the mapping between a DRB and a QoS flow.

In the foregoing three possible implementations of S105, after the first access network node selects the first local routing node and the second local routing node, on a basis of S106, the method in this embodiment may further include: The first access network node sends second routing information to the second local routing node. The second routing information includes the group ID, the air interface identifier of the first terminal device, and the air interface identifier of the second terminal device, or the second routing information includes the group ID, the air interface identifier of the first terminal device, the air interface identifier of the second terminal device, and a local routing rule, and the local routing rule is used by the second local routing node to perform local routing.

It should be noted that, when the second local routing node and the first local routing node are the same, the air interface identifier of the first terminal device has been sent in S106, and is sent again in this implementation. The first access network node may ignore the received air interface identifier of the first terminal device, and send only a newly received air interface identifier of a terminal device.

It should be noted that, it is assumed that the binding information includes session information of a plurality of PDU sessions, for example, the binding information includes the session information of the first PDU session, the session information of the second PDU session, . . . , and the session information of the $N^{th}$ PDU session; and the first PDU session is a session established by the first terminal device, the second PDU session is a session established by the second terminal device, and the $N^{th}$ PDU session is a session established by the $N^{th}$ terminal device. In this case, after selecting one or more local routing nodes in S105, the first access network node sends routing information to each selected local routing node. The routing information includes the group ID and air interface identifiers of all the terminal devices corresponding to all the session information in the binding information, or the routing information includes the group ID, the air interface identifiers of all the terminal devices corresponding to all the session information in the binding information, and a local routing rule.

Optionally, the method in this embodiment may further include: The first access network node receives the local switching indication sent by the core network element. Correspondingly, the first routing information further includes the local switching indication. It should be noted that, in S105, the first access network node selects the first local routing node based on the session information of the first PDU session and the local routing node selection information. The selected first local routing node may alternatively be the first access network node. If the first access network node is selected, S106 may be omitted.

S107: The first local routing node receives user plane data sent by the first terminal device.

In this embodiment, the first routing node may be an IAB node.

S108: The first local routing node determines, based on the air interface identifier of the first terminal device, a group to which the first terminal device belongs, and obtains the corresponding local routing rule through matching based on the group.

The air interface identifier of the first terminal device may be any identifier that can uniquely identify the first terminal, for example, a data radio bearer identifier (Data Radio Bearer ID, DRB ID)/signaling bearer identifier SRB ID (signaling Radio Bearer), a DU ID, or a cell radio network temporary identifier (C-RNTI).

S109: The first local routing node forwards the user plane data according to the local routing rule and the local switching indication.

In a possible implementation, the method in this embodiment may further include the following steps:

The first local routing node receives the local switching indication sent by the first access network node, and the first local routing node generates the local routing rule. A passive generation manner may be used: Each time user plane data sent by the terminal device enters the first local routing node, the first local routing node checks a PDU layer data header. If a user plane performs communication through industrial Ethernet, information such as a source/destination MAC address is obtained; or if a user plane performs communication through an IP protocol, information such as a source/destination IP address is obtained, and a correspondence between a source address and an uplink radio link control (RLC) logical channel identifier (LCID) is generated. In this case, the local routing rule includes the correspondence between a source terminal address and an uplink RLC channel.

Alternatively, an active generation manner may be used: The first local routing node actively obtains an IP address or a MAC address of the first local routing node from a group member, and stores a correspondence between an IP address or a MAC address and a communications channel LCID. In this case, the local routing rule includes the correspondence.

It should be noted that, regardless of the passive manner or the active manner, when the terminal device is customer-premises equipment CPE, a plurality of IP/MAC addresses may be obtained, in other words, there is a one-to-many relationship between an LCID and IP/MAC addresses.

In another possible implementation, the method in this embodiment may further include: The first local routing node receives the local routing rule and the local switching indication that are sent by the first access network node. In this manner, the local routing rule is generated by the first access network node and then sent to the first local routing node. A manner in which the first access network node generates the local routing rule may be: The first access network node actively obtains an IP address or a MAC address of the first access network node from a group member, and stores a correspondence between an IP address or a MAC address and a communications channel LCID. In this case, the local routing rule includes the correspondence.

In this embodiment, the local switching indication is an Ethernet layer switching indication or an internet protocol layer switching indication. S109 may be specifically as follows:

If the local switching indication is the Ethernet layer switching indication, a local routing node removes a PDCP/SDAP packet header in which user plane data is located, and forwards, to an industrial Ethernet/IP network through switch forwarding, data obtained by removing the PDCP/SDAP packet header.

If the local switching indication is the internet protocol layer switching indication, a local routing node removes a PDCP/SDAP packet header or a MAC header, and then forwards, to an industrial Ethernet/IP network through a router, data obtained by removing the PDCP/SDAP packet header or the MAC header.

According to the data transmission method provided in this embodiment, after receiving the first message sent by the first terminal device, when determining, based on the group information corresponding to the first terminal device, that the first terminal device needs to perform local routing, the core network element obtains the binding information including the group ID and the session information of the first PDU session, and then sends the binding information to the first access network node. The first access network node selects, based on the session information of the first PDU session and the local routing node selection information, the first local routing node that provides the local routing service for the first terminal device, and sends the first routing information to the first local routing node. The first local routing node may be an IAB node. Therefore, after receiving the user plane data sent by the first terminal device, the first local routing node determines, based on the air interface identifier of the first terminal device, the group to which the first terminal device belongs, obtains the corresponding local routing rule through matching based on the group, and finally forwards the user plane data according to the local routing rule and the local switching indication. In this way, IAB based local routing can be implemented, so that user plane data can be directly forwarded inside an IAB node or between IAB nodes, and the data does not need to be transmitted to a donor node and a core network. This can shorten a transmission latency to a maximum extent, and implement local data closed-loop.

After a local routing group is established by using the solution shown in FIG. 2, group update, group query, group deletion, and the like may further exist subsequently. The following describes in detail a group update process, a group query process, and a group deletion process with reference to FIG. 3A and FIG. 3B.

Figure 3A:
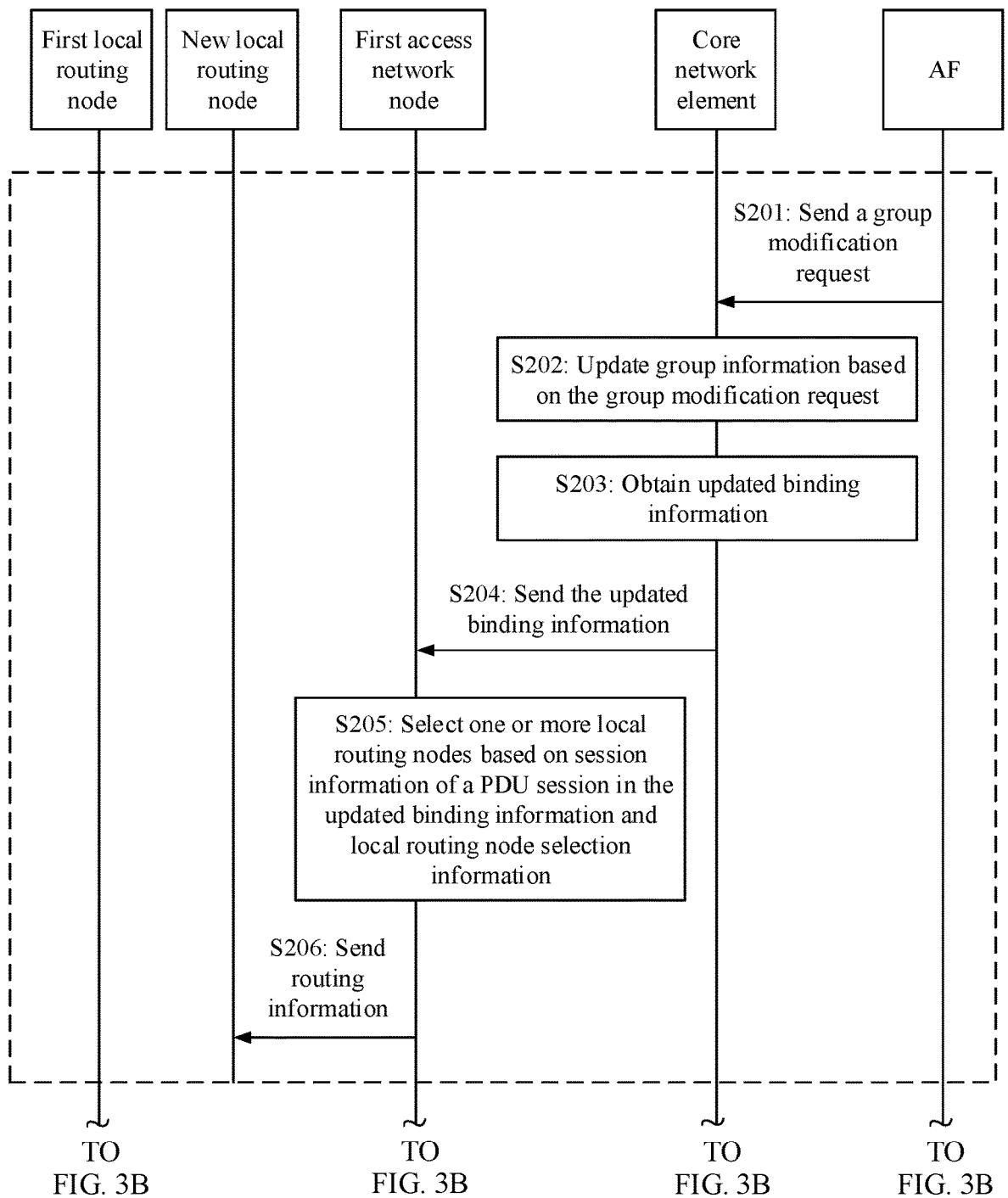
FIG. 3A and FIG. 3B are an interaction flowchart of an embodiment of a data transmission method according to this application.
Figure 3B:
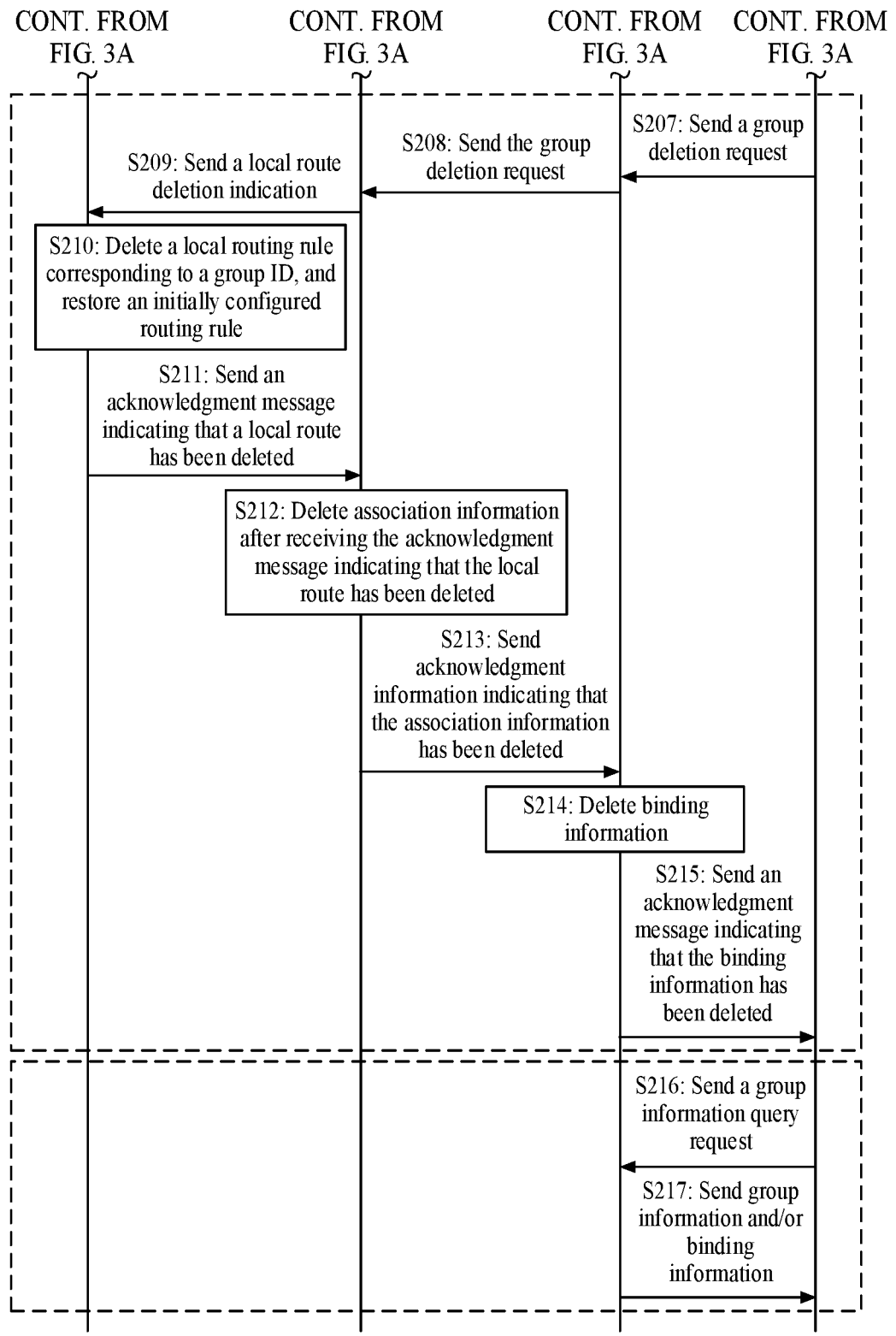

FIG. 3A and FIG. 3B are an interaction flowchart of an embodiment of a data transmission method according to this application. As shown in FIG. 3A and FIG. 3B, the method in this embodiment may include the following steps.

S201: A core network element receives a group modification request sent by an AF, where the group modification request includes any one or more of a group ID, an updated group member list, an updated local routing node list, an updated local switching indication, and an updated service identifier.

In other words, if any one or more of the group ID, a group member list, a local routing node list, a local switching indication, and a service identifier are updated, a group is also updated.

S202: The core network element updates group information based on the group modification request.

S203: The core network element obtains updated binding information.

Specifically, binding is binding the group information to session information of a PDU session. When the group information changes, binding information is also updated, and the binding information is uniquely identified by a group ID. The updated binding information includes the group ID and the session information of the PDU session.

S204: The core network element sends the updated binding information to a first access network node.

S205: The first access network node selects one or more local routing nodes based on the session information of the PDU session in the updated binding information and local routing node selection information, where a local routing node provides a local routing service for a terminal device corresponding to the PDU session.

If a selected local routing node list is different from a source local routing node list, the method in this embodiment further includes the following step:

S206: The first access network node sends routing information to the one or more selected local routing nodes, where the routing information includes the group ID and air interface identifiers of all terminal devices corresponding to session information of PDU sessions in the updated binding information, or the routing information includes the group ID, the air interface identifiers of all the terminal devices corresponding to the session information of the PDU sessions in the updated binding information, and a local routing rule.

A subsequent procedure of processing a local routing node is the same as the procedure of processing the first local routing node in S107 to S109. Details are not described herein again. According to the data transmission method provided in this embodiment, after receiving the group modification request sent by the AF, the core network element updates the group information based on the group modification request, obtains the updated binding information, and finally sends the updated binding information to the first access network node. This implements local routing group update.

A group deletion procedure is as follows:

S207: The core network element receives a group deletion request sent by the AF, where the group deletion request includes the group ID that is requested to be deleted.

S208: The core network element sends the group deletion request to the first access network node.

Correspondingly, the first access network node receives the group deletion request sent by the core network element. The group deletion request includes the group ID that is requested to be deleted.

S209: The first access network node sends a local route deletion indication to a first local routing node, where the local route deletion indication includes the group ID that is requested to be deleted.

If there are two local routing nodes, S207 is: The first access network node sends the local route deletion indication to the first local routing node and/or a second local routing node.

S210: After receiving the local route deletion indication, the first local routing node deletes a local routing rule corresponding to the group ID, and restores an initially configured routing rule.

S211: After successfully deleting the local routing rule, the first local routing node sends, to the first access network node, an acknowledgment message indicating that a local route has been deleted.

S212: After receiving the acknowledgment message indicating that the local route has been deleted, the first access network node deletes association information, where the association information includes the group ID and the local routing node list.

S213: The first access network node sends, to the core network element, acknowledgment information indicating that the association information has been deleted.

S214: The core network element deletes the binding information after receiving the acknowledgment information that is sent by the first access network node and that indicates that the association information has been deleted.

S215: The core network element sends, to the AF, an acknowledgment message indicating that the binding information has been deleted.

The data transmission method provided in this embodiment implements group deletion.

A group query procedure is as follows:

S216: The core network element receives a group information query request sent by the AF, where the group information query request includes the group ID.

S217: The core network element sends the group information and/or the binding information to the AF.

Specifically, after receiving the group information query request, the core network element may perform query as required, for example, may query only the group information, or may query the group information and the binding information.

Optionally, after receiving the group information query request, the core network element may further send an association information request and/or a topology information request to the first access network node, and receive association information and/or topology information sent by the first access network node. The association information includes the group ID and the first local routing node. Finally, the core network element sends the association information and/or the topology information to the AF.

The data transmission method provided in this embodiment implements group query. It should be noted that there is no association between and there is no sequence of performing the group query procedure in S216 and S217 and the foregoing group query procedure and the foregoing group modification procedure.

The following uses several specific embodiments to describe in detail the technical solutions of the method embodiments shown in FIG. 2, and FIG. 3A and FIG. 3B. In the following embodiments, an example in which the core network element and the first access network node are IAB donor nodes and the first routing node is an IAB node is used for description.

Figure 4A:
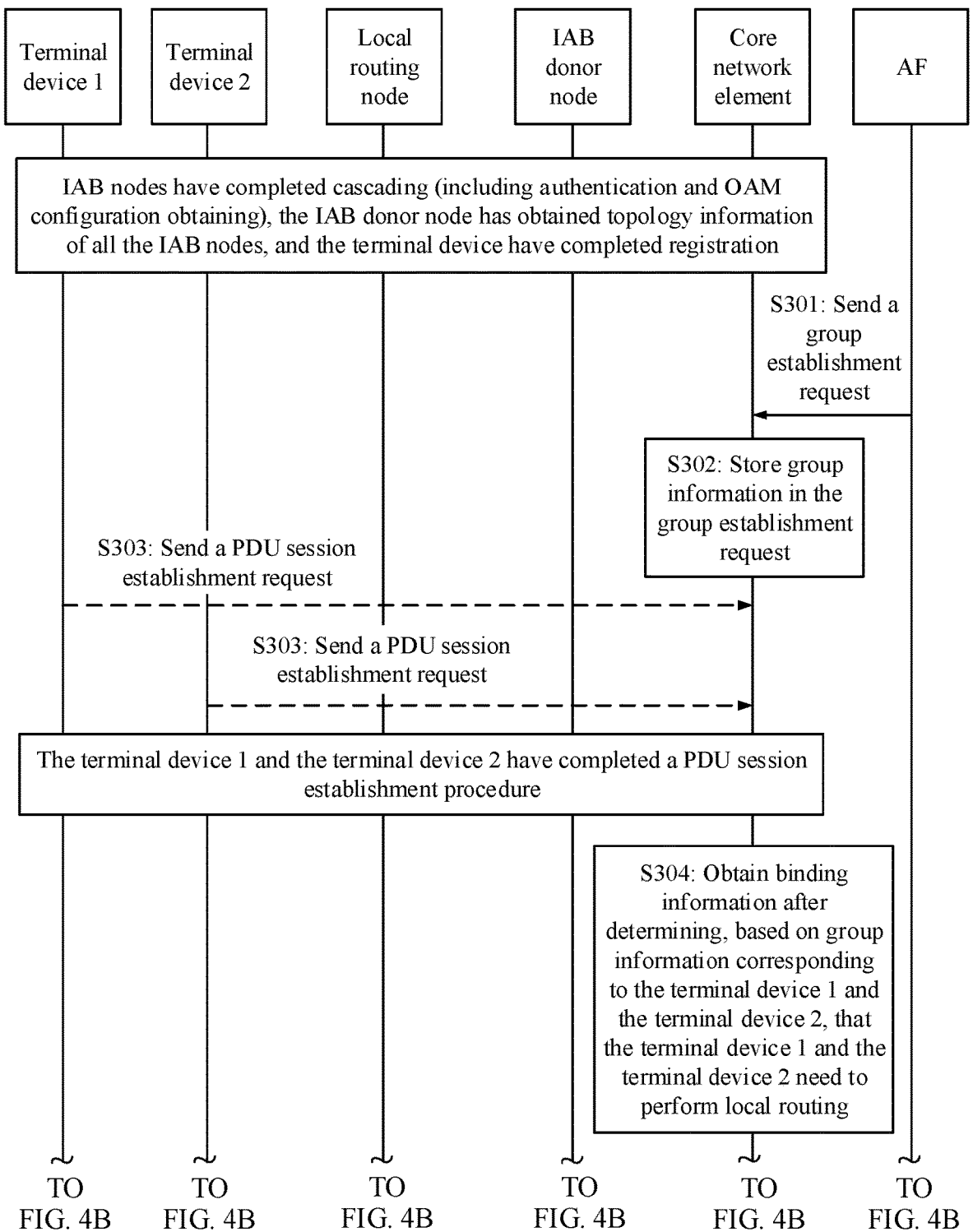
FIG. 4A and FIG. 4B are a flowchart of an embodiment of a data transmission method according to this application.
Figure 4B:
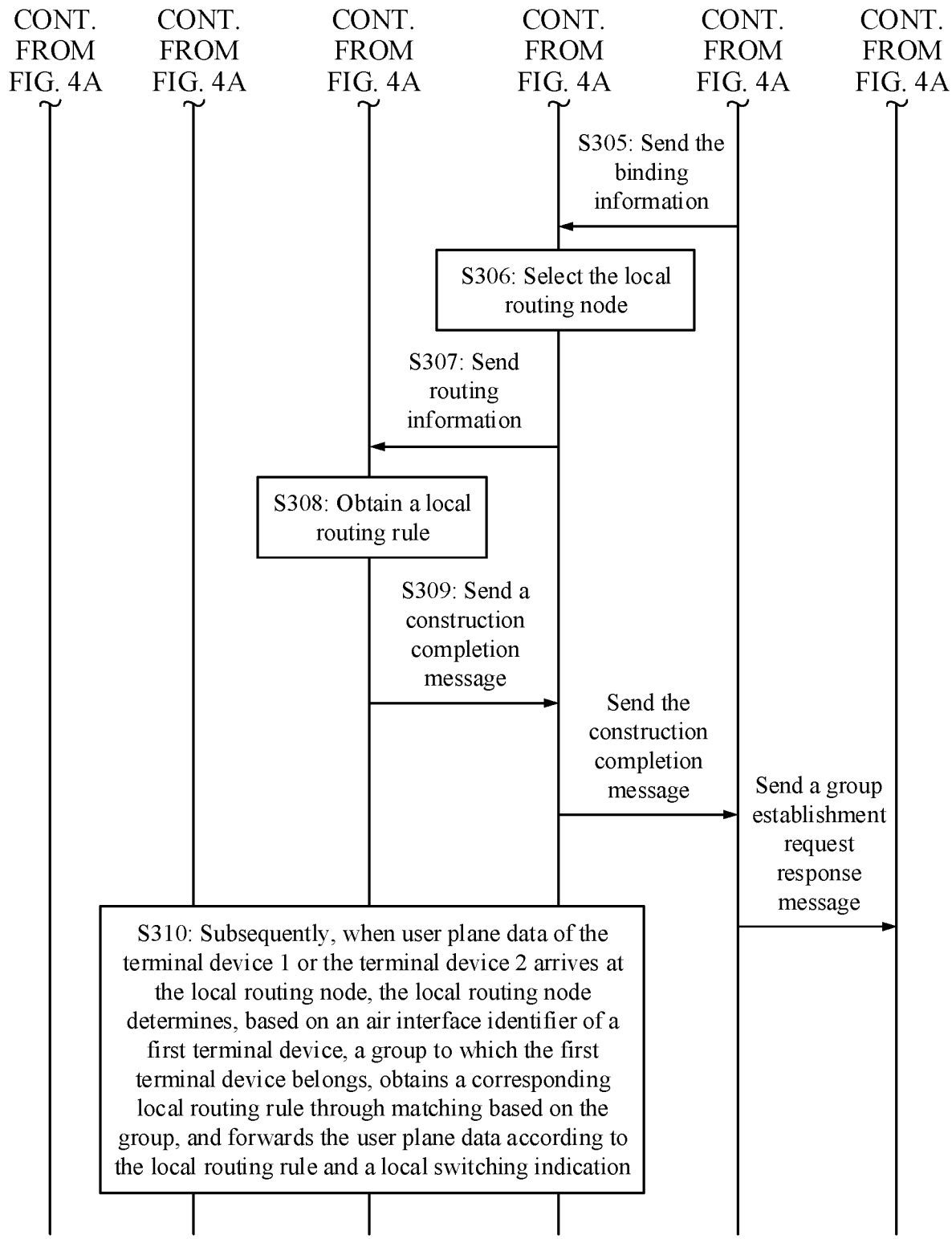

FIG. 4A and FIG. 4B are a flowchart of an embodiment of a data transmission method according to this application. As shown in FIG. 4A and FIG. 4B, the method in this embodiment may include the following steps.

S301: An application function (AF) network element sends a group establishment request to a core network element to request to establish a local route.

Before S301, IAB nodes have completed a cascading procedure (including completing a NAS authentication procedure, and completing a cascading sub-procedure, for example, obtaining OAM configuration information through a user plane), an IAB donor node has obtained topology information of all the LAB nodes, and terminal devices have completed registration.

Specifically, the group establishment request may be sent to the CN network element directly or by using a capability exposure platform. The group establishment request includes a group ID, and may further include a local switching indication. The local switching indication is an Ethernet layer switching indication or an internet protocol (IP) layer switching indication, and is used to indicate whether local switching is performed based on an Ethernet layer or an IP layer. Optionally, the group establishment request may further include a group member list, a local routing node list, and other group-related parameters. The group member list may also be preconfigured in the core network element (for example, a unified data management (UDM) network element/a unified data repository (UDR) network element). The group member list may be represented in a form of a generic public subscription identifier (GPSI), an international mobile subscriber identity (IMSI) IMSI/international mobile equipment identity (IMEI) or a RAN-side terminal device identifier (for example, a DRB ID or an LCID).

The local routing node list is used as a reference for selection by the IAB donor node. A specific form of a local routing node may be an IAB node ID.

The other group-related parameters include, for example, group-associated data network name (DNN) information and PDU session type information of a group member.

S302: The core network element stores group information in the group establishment request.

The stored group information includes at least the group ID and the group member list.

S303: A terminal device 1 and a terminal device 2 separately send a PDU session establishment request to the core network element, where the PDU session establishment request carries a PDU session ID and a DNN.

S304: When or after the terminal device 1 and the terminal device 2 establish PDU sessions, the core network element obtains binding information after the core network element determines, based on group information corresponding to the terminal device 1 and the terminal device 2, that the terminal device 1 and the terminal device 2 need to perform local routing, where the binding information includes the group ID, session information of a first PDU session, and session information of a second PDU session, and session information includes one or more of a session ID, a tunnel endpoint identifier TEID, and a flow identifier QFIs of a PDU session.

S305: The core network element sends the binding information to the IAB donor node, where the binding information includes the group ID, the session information of the first PDU session, and the session information of the second PDU session.

S306: The IAB donor node selects a local routing node. Specifically, if the group establishment request further includes the local routing node list, the IAB donor node (which may be specifically a CU in the IAB donor node) first checks, based on an IAB topology relationship, and capability information and configuration information of a local routing node in the local routing node list, whether the specified local routing node meets a condition.

If the condition is met, routing information and the selected local routing node are obtained. There may be one or two selected local routing nodes. If there is one local routing node, the routing information includes the group ID, an air interface identifier of the terminal device 1, and an air interface identifier of the terminal device 2, or the routing information includes the group ID, the air interface identifier of the terminal device 1, the air interface identifier of the terminal device 2, and a local routing rule.

If the condition is not met, the IAB donor node re-selects a local routing node based on the IAB topology relationship and selection policy information. An example of a tree IAB topology is used. A selection method in an embodiment is: selecting a minimum common parent node of a terminal device in a group as a local routing node. After the selection is completed, routing information and the selected local routing node are also obtained. There may be one or two selected local routing nodes. If there is one local routing node, the routing information includes the group ID, an air interface identifier of the terminal device 1, and an air interface identifier of the terminal device 2, or the routing information includes the group ID, the air interface identifier of the terminal device 1, the air interface identifier of the terminal device 2, and a local routing rule.

S307: The IAB donor node sends the routing information to the local routing node. The routing information includes the group ID, the air interface identifier of the terminal device 1, and the air interface identifier of the terminal device 2, or the routing information includes the group ID, the air interface identifier of the terminal device 1, the air interface identifier of the terminal device 2, and the local routing rule. The local routing rule is optional. The local routing node may generate the local routing rule based on a local routing indication and a group attribute. The local routing rule may include priority information to ensure that the local routing rule is preferentially executed.

S308: The local routing node obtains the local routing rule. Specifically, after the local routing node receives the routing information sent by the IAB donor node, if the routing information includes the local routing rule, the local routing node updates the local routing rule according to the local routing rule included in the routing information, or generates the local routing rule according to the local switching indication, and enables a capability of a switch or a capability of a route, for example, a MAC address learning function or an IP address learning function. In addition, the local routing node determines a local switching type according to the local switching indication, in other words, determines whether local switching is performed based on a MAC layer or the IP layer.

S309: After a local route is successfully constructed, the local routing node sends a construction completion message to the IAB donor node, the IAB donor node sends the construction completion message to the core network element, and the core network element sends a group establishment request response message to the AF.

S310: Subsequently, when user plane data of the terminal device 1 or the terminal device 2 arrives at the local routing node, the local routing node determines, based on an air interface identifier of a first terminal device, a group to which the first terminal device belongs, obtains a corresponding local routing rule through matching based on the group, and forwards the user plane data according to the local routing rule and the local switching indication.

Specifically, if the local switching indication is the Ethernet layer switching indication, a local routing node removes a PDCP/SDAP packet header in which user plane data is located, and forwards, to an industrial Ethernet/IP network through switch forwarding, data obtained by removing the PDCP/SDAP packet header.

If the local switching indication is the internet protocol layer switching indication, a local routing node removes a PDCP/SDAP packet header or a MAC header, and then forwards, to an industrial Ethernet/IP network through a router, data obtained by removing the PDCP/SDAP packet header or the MAC header.

Figure 5A:
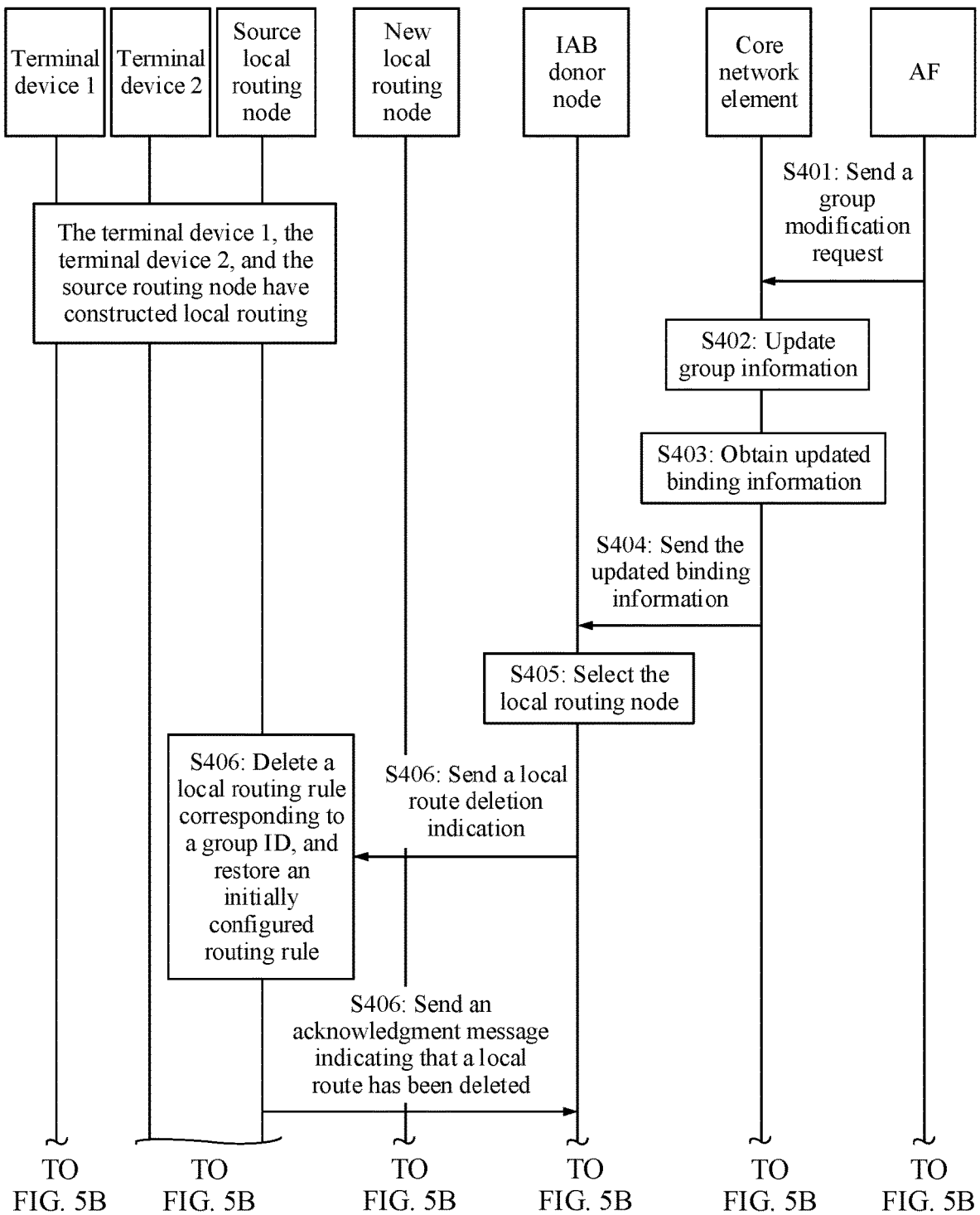
FIG. 5A and FIG. 5B are a flowchart of an embodiment of a data transmission method according to this application.
Figure 5B:
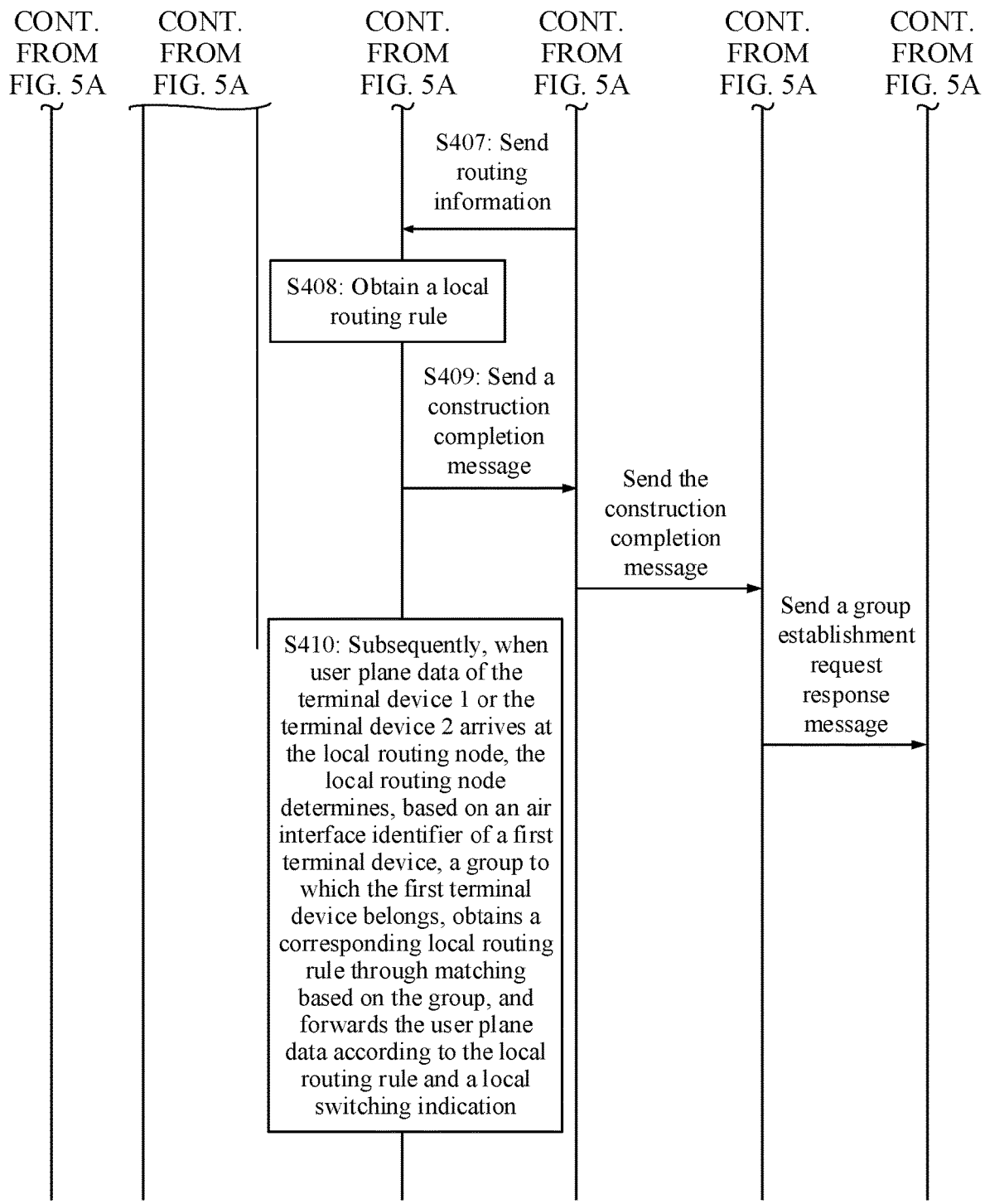

According to the procedure shown in FIG. 4A and FIG. 4B, the terminal device 1, the terminal device 2, and the local routing node have established local routes. The following describes a group update process with reference to FIG. 5A and FIG. 5B. FIG. 5A and FIG. 5B is a flowchart of an embodiment of a data transmission method according to this application. As shown in FIG. 5A and FIG. 5B, the method in this embodiment may include the following steps.

S401: An AF sends a group modification request to a core network element directly or by using a capability exposure platform, to request to modify a local route.

The group modification request includes any one or more of a group ID, an updated group member list, an updated local routing node list, an updated local switching indication, and an updated service identifier.

In other words, if any one or more of the group ID, a group member list, a local routing node list, a local switching indication, and a service identifier are updated, a group is also updated.

S402: The core network element stores group information in the group modification request, and may specifically update the stored group information based on the group ID.

S403: The core network element obtains updated binding information.

S404: The core network element sends the updated binding information to an IAB donor node.

Specifically, during actual group modification, a group member may change. In this embodiment, assuming that a group member does not change, it means that a specified local routing node, a local switching indication, or other parameter information changes.

S405: Select a local routing node, where if the group modification request further includes the updated local routing node list, the IAB donor node first checks, based on an IAB topology relationship, and capability information and configuration information of a local routing node in the local routing node list, whether the specified local routing node meets a condition.

If the condition is met, routing information and the selected local routing node are obtained. There may be one or two selected local routing nodes. If there is one local routing node, the routing information includes the group ID, an air interface identifier of the terminal device 1, and an air interface identifier of the terminal device 2, or the routing information includes the group ID, the air interface identifier of the terminal device 1, the air interface identifier of the terminal device 2, and a local routing rule.

If the condition is not met, the IAB donor node re-selects a local routing node based on the IAB topology relationship and selection policy information. An example of a tree IAB topology is used. A selection method in an embodiment is: selecting a minimum common parent node of a terminal device in a group as a local routing node. After the selection is completed, routing information and the selected local routing node are also obtained. There may be one or two selected local routing nodes. If there is one local routing node, the routing information includes the group ID, an air interface identifier of the terminal device 1, and an air interface identifier of the terminal device 2, or the routing information includes the group ID, the air interface identifier of the terminal device 1, the air interface identifier of the terminal device 2, and a local routing rule.

S406: If the local routing node selected by the IAB donor node in S405 is different from a source local routing node, the IAB donor node first sends a local route deletion indication to the source local routing node, where the local route deletion indication includes the group ID that is requested to be deleted. Therefore, after receiving the local route deletion indication, the source local routing node deletes a local routing rule corresponding to the group ID, and restores an initially configured routing rule. After successfully deleting the local routing rule, the source local routing node sends, to the IAB donor node, an acknowledgment message indicating that a local route has been deleted.

S407: The IAB donor node sends the routing information to the newly selected local routing node, where the routing information includes the group ID, the air interface identifier of the terminal device 1, and the air interface identifier of the terminal device 2, or the routing information includes the group ID, the air interface identifier of the terminal device 1, the air interface identifier of the terminal device 2, and the local routing rule.

The following procedures of S408 to S410 are the same as S308 to S310 shown in FIG. 3A and FIG. 3B. Details are not described herein again.

Figure 6A:
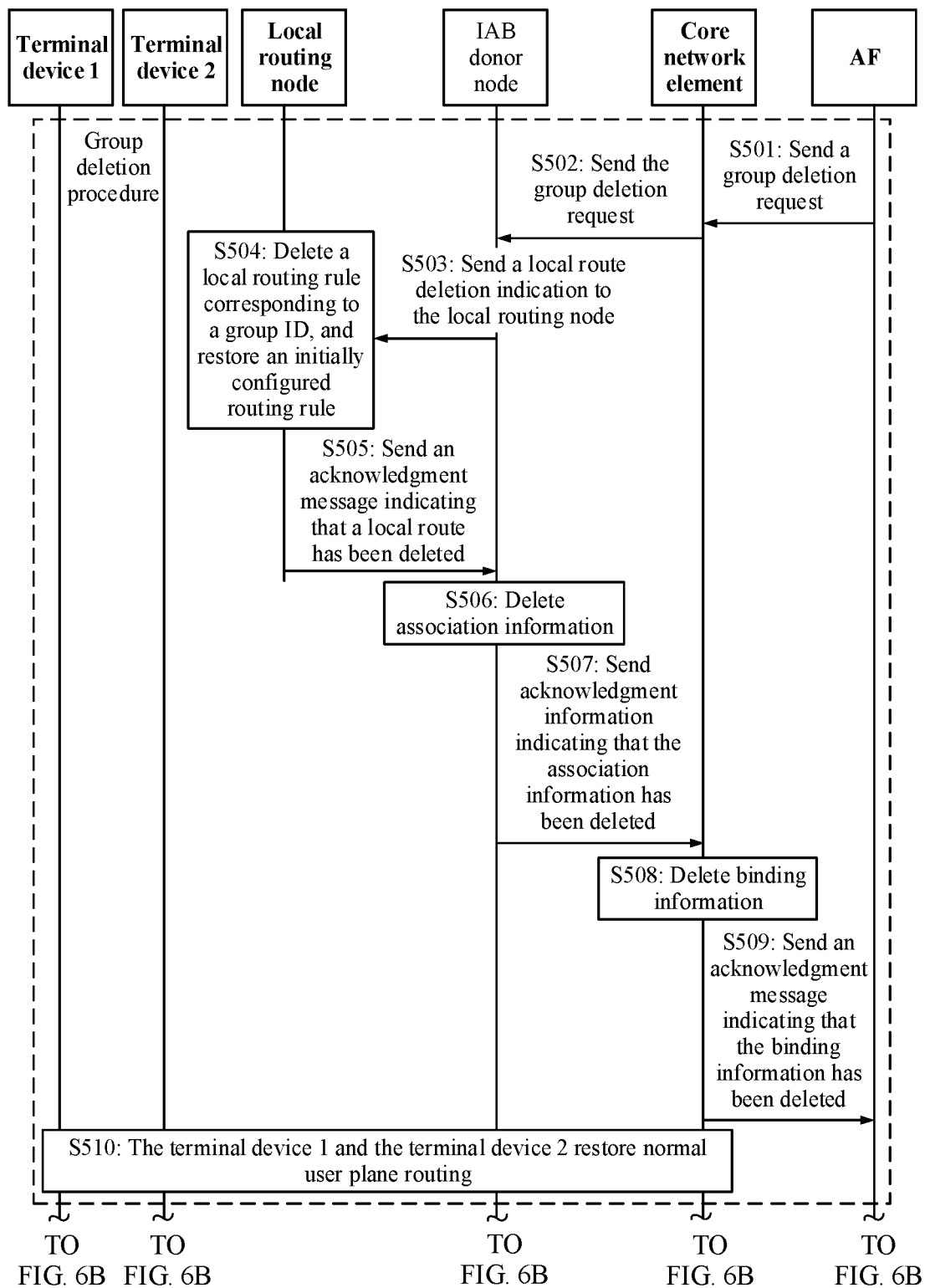
FIG. 6A and FIG. 6B are a flowchart of an embodiment of a data transmission method according to this application.
Figure 6B:
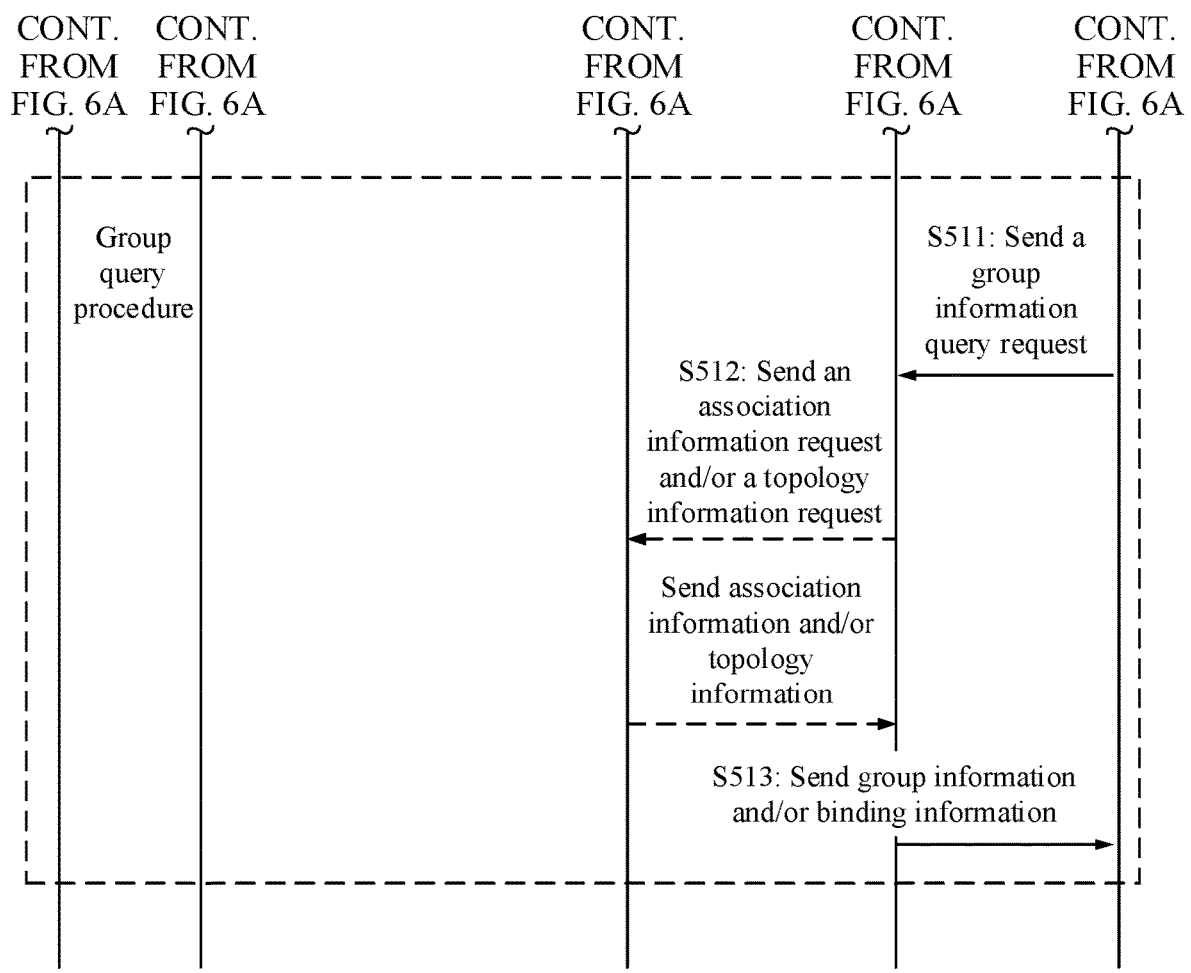

FIG. 6A and FIG. 6B are a flowchart of an embodiment of a data transmission method according to this application. This embodiment describes group deletion and query processes. As shown in FIG. 6A and FIG. 6B, the method in this embodiment may include the following steps.

S501: An AF sends a group deletion request to a core network element directly or by using a capability exposure platform, to request to delete a local route, where the group deletion request includes a group ID that is requested to be deleted.

S502: The core network element sends the group deletion request to an IAB donor node.

S503: The IAB donor node sends a local route deletion indication to a local routing node, where the local route deletion indication includes the group ID that is requested to be deleted.

S504: After receiving the local route deletion indication, the local routing node deletes a local routing rule corresponding to the group ID, and restores an initially configured routing rule.

S505: After successfully deleting the local routing rule, the local routing node sends, to the IAB donor node, an acknowledgment message indicating that a local route has been deleted.

S506: After receiving the acknowledgment message indicating that the local route has been deleted, the IAB donor node deletes association information, where the association information includes the group ID and a local routing node list.

S507: After successfully deleting the association information, the IAB donor node sends, to the core network element, acknowledgment information indicating that the association information has been deleted.

S508: The core network element deletes binding information.

S509: After completing the deletion, the core network element sends, to the AF, an acknowledgment message indicating that the binding information has been deleted.

S510: A terminal device 1 and a terminal device 2 restore normal user plane routing.

A group query procedure is as follows:

S511: The AF network element sends a group information query request to the core network element, where the group information query request includes the group ID.

S512: The core network element sends an association information request and/or a topology information request to the IAB donor node, and receives association information and/or topology information sent by the IAB donor node.

S512 is optional.

S513: The core network element sends group information and/or the binding information to the AF network element.

Optionally, the group information and/or the binding information may further include the association information and/or the topology information requested in S512.

Figure 7:
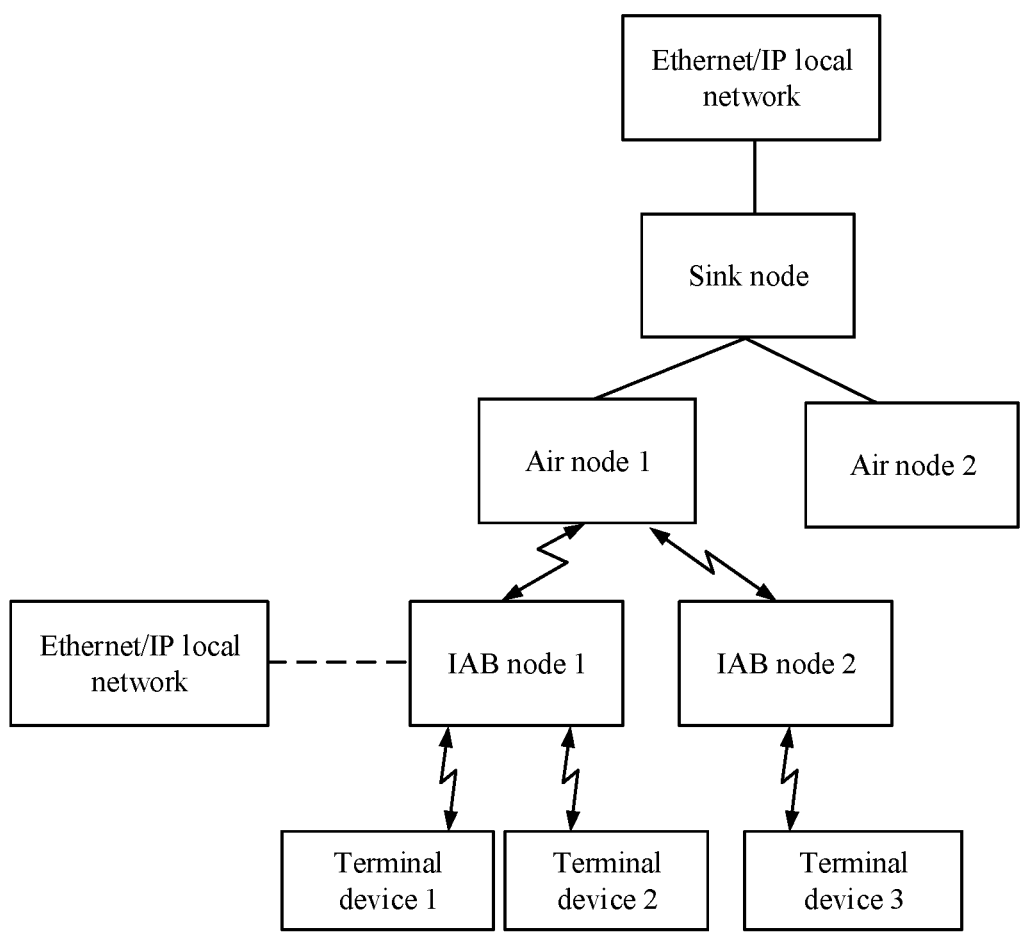
FIG. 7 is a schematic diagram of another system architecture in this application.

FIG. 7 is a schematic diagram of another system architecture in this application. As shown in FIG. 7, the system architecture includes an IAB node, an air node, and a sink node. The IAB node has a CU-UP capability, in other words, has a PDCP protocol stack and an SDAP protocol stack. If there is an interface, the IAB node may directly forward user plane data to an Ethernet or IP local network. The air node has a capability of an IAB donor node, and has both mobility management and session management functions, that is, functions of AMF and SMF network elements in a standard architecture. In addition to a function of a core network element included by the air node, the sink node further includes a function of another core network element (such as a UDM/UDR network element), and also includes a network management OAM capability.

Under the system architecture shown in FIG. 7, this application provides a data transmission method and apparatus. In this way, IAB based local routing can be implemented, so that user plane data can be directly forwarded inside an IAB node or between IAB nodes, and the data does not need to be transmitted to an IAB donor node and a core network. This can shorten a transmission latency to a maximum extent, and implement local data closed-loop. The following describes in detail a specific process of the data transmission method provided in this application with reference to the accompanying drawings.

Figure 8:
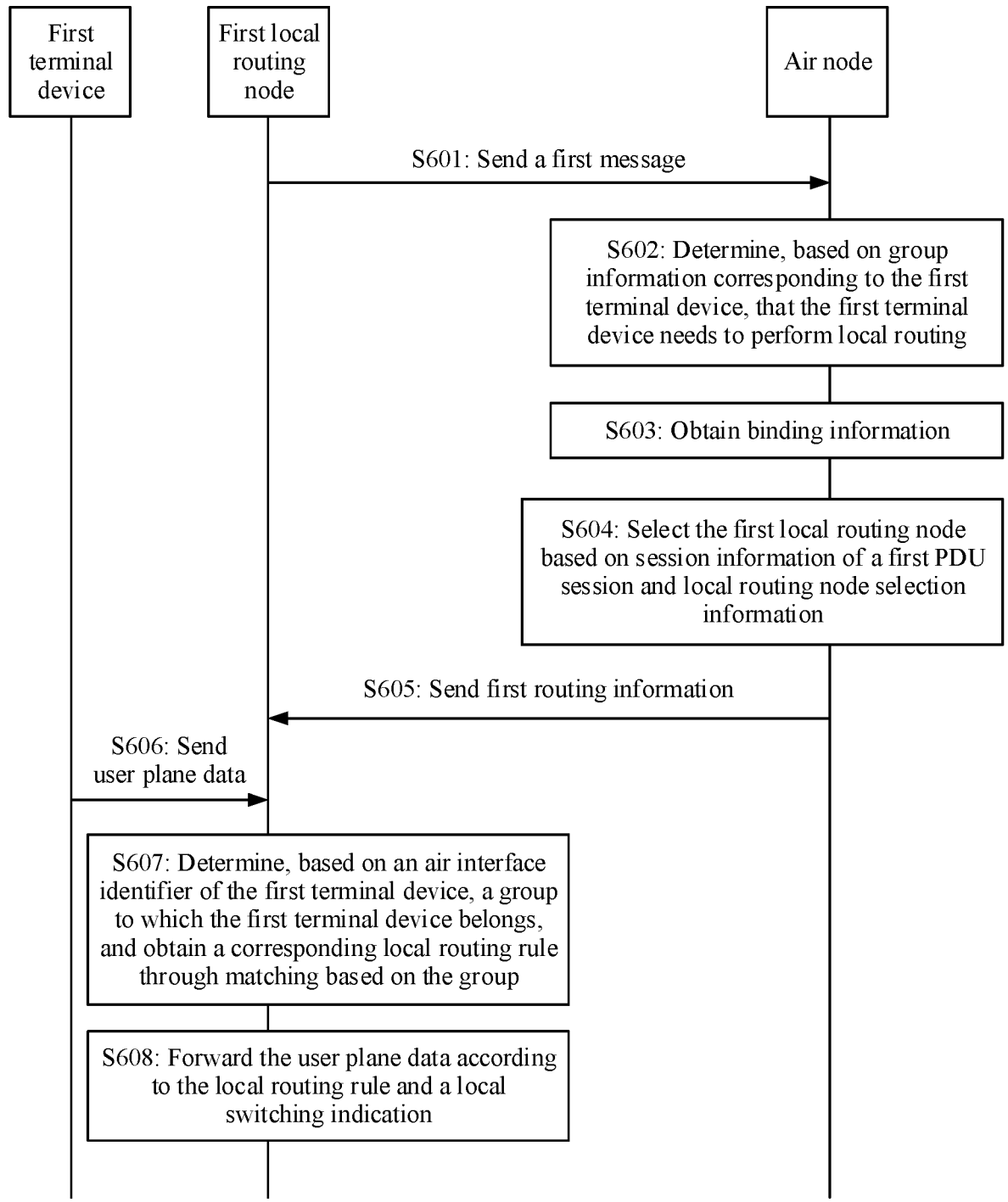
FIG. 8 is an interaction flowchart of an embodiment of a data transmission method according to this application.

FIG. 8 is an interaction flowchart of an embodiment of a data transmission method according to this application. As shown in FIG. 8, the method in this embodiment may include the following steps.

S601: An air node receives a first message sent by a first terminal device, where the first message is used to request to establish a first protocol data unit PDU session.

Optionally, the first message includes a service identifier. The service identifier may include a session ID of the first PDU session and/or a data network name (DNN), and the DNN identifies a service type of a terminal device. In other words, the service identifier may be represented by the session ID of the first PDU session, or may be represented by the DNN, or may be represented by both the session ID of the first PDU session and the DNN. Specifically, a session ID of a PDU session is generated by the terminal device. If it is specified in advance that session ID sequence numbers of PDU sessions in different ranges indicate different services, after the terminal device adds a session ID in a specific sequence number range, a network side can identify a service type. Therefore, the session ID of the first PDU session may be used as the service identifier.

S602: The air node determines, based on group information corresponding to the first terminal device, that the first terminal device needs to perform local routing, where the group information includes a group identifier ID and a group member list.

The group member list may be a list including a plurality of group member IDs. In a possible implementation, when the first message includes the service identifier, S602 may be specifically: The core network element determines, based on the group information corresponding to the first terminal device and the service identifier, that the first terminal device needs to perform local routing.

Further, when the service identifier includes the session ID of the first PDU session and/or the DNN, that the air node determines, based on the group information corresponding to the first terminal device and the service identifier, that the first terminal device needs to perform local routing may be specifically: The air node determines, based on the group information corresponding to the first terminal device and the session ID of the first PDU session and/or the DNN, that the first terminal device needs to perform local routing. That the air node determines, based on the group information corresponding to the first terminal device and the session ID of the first PDU session, that the first terminal device needs to perform local routing may be specifically: if the group information includes a service identifier that may be identified by a session ID, a DNN, or both, when a terminal ID is a group member, and the session ID of the first PDU matches a service identifier in a group, performing local routing based on the group.

That the air node determines, based on the group information corresponding to the first terminal device and the DNN, that the first terminal device needs to perform local routing may be specifically: if the group information includes a service identifier that may be identified by a session ID, a DNN, or both, when a terminal ID is a group member, and the DNN carried in the first message matches a service identifier in a group, performing local routing based on the group.

That the air node determines, based on the group information corresponding to the first terminal device, the session ID of the first PDU session, and the DNN, that the first terminal device needs to perform local routing may be specifically: if the group information includes a service identifier that may be identified by a session ID, a DNN, or both, when a terminal ID is a group member, and the DNN and the session ID that are carried in the first message matches a service identifier in a group, performing local routing based on the group. When the first message does not carry the service identifier or group information corresponding to a terminal does not include service information, it is considered by default that all terminal devices in the group support only or have a unique data service.

In this embodiment, optionally, before S101, the method may further include: The air node receives a group establishment request sent by a sink node. The group establishment request includes the group ID. The air node stores the group ID in the group information.

Optionally, the group establishment request further includes the group member list and/or a local routing node list. In other words, the group establishment request may further include the group member list; or the group establishment request may further include the local routing node list, and the local routing node list is one or more specified local routing nodes used by the terminal device to perform local routing; or the group establishment request may further include the group member list and the local routing node list. If the group establishment request does not include the group member list, the group member list may be preconfigured in the air node.

Optionally, the group establishment request further includes a local switching indication. The local switching indication is an Ethernet layer switching indication or an internet protocol layer switching indication.

S603: The air node obtains binding information, where the binding information includes the group ID and session information of the first PDU session, and the session information includes one or more of the session ID, a TEID, and a QFIs of the first PDU session.

The first terminal device may correspond to a plurality of pieces of group information, and the group information corresponding to the first terminal device includes a packet service identifier. When the service identifier in the first message matches the packet service identifier, it is determined that local routing needs to be performed. The session information is also bound to the service identifier.

S604: The air node selects a first local routing node based on the session information of the first PDU session and local routing node selection information, where the first local routing node provides a local routing service for the first terminal device.

The local routing node selection information includes one or more of topology information, a selection policy, configuration information, capability information, and a local routing node list sent by the core network element. Specifically, if the air node can learn of a hierarchical relationship between an IAB node managed by the air node and a terminal device. Specifically, if the LAB node is constructed in a form of a spanning tree, the air node can obtain identifiers and locations of each branch and each leaf node device in the spanning tree. The leaf node may be a terminal device or an IAB node. If the IAB node is constructed in a form of a directed acyclic graph, the air node can obtain device identifiers and locations of each edge and vertex in the graph. The vertex may be a terminal device or an IAB node.

In a possible implementation, that the air node selects a first local routing node based on the session information of the first PDU session and local routing node selection information may be specifically: The air node stores a mapping relationship between an air interface bearer (DRB ID identifier) and a QoS flow (QFI). After obtaining the session information in the binding information, the air node obtains, based on the mapping relationship between a DRB and a QoS flow, a group member list (in a form of a DRB ID list) on which local routing needs to be performed, and then selects an appropriate local routing node based on a location of a group member in a topology, the selection policy, the configuration information, and capability information of an IAB node in the topology. The air node may select a plurality of local routing nodes based on different group member distribution. When the binding information includes session information of at least two PDU sessions, the air node selects a local routing node based on the binding information and the local routing node selection information in the following three possible implementations in this embodiment.

Manner 1: The binding information further includes session information of a second PDU session, and the second PDU session is a session established by a second terminal device. The method in this embodiment may further include: The air node selects a second local routing node based on the session information of the first PDU session, the session information of the second PDU session, and the local routing node selection information. The second local routing node provides a local routing service for the second terminal device. The second local routing node and the first local routing node may be the same. In other words, one local routing node serves a plurality of terminal devices.

Manner 2: In an optional embodiment, the binding information further includes session information of a second PDU session, and the second PDU session is a session established by a second terminal device. The method in this embodiment may further include: The air node selects a second local routing node based on the first local routing node, the session information of the first PDU session, the session information of the second PDU session, and the local routing node selection information. The second local routing node provides a local routing service for the second terminal device. The second local routing node and the first local routing node may be the same. In other words, one local routing node serves a plurality of terminal devices.

Manner 3: The binding information further includes session information of a second PDU session, and the second PDU session is a session established by a second terminal device. In this case, S604 may be specifically: The air node selects the first local routing node and a second local routing node based on the session information of the first PDU session, the session information of the second PDU session, and the local routing node selection information. The second local routing node provides a local routing service for the second terminal device.

An example in which the binding information includes session information of at least two PDU sessions is used for description above. The foregoing manner is also applicable to a scenario in which the binding information includes session information of more than two PDU sessions. Manner 3 is used as an example. It is assumed that the binding information includes session information of a plurality of PDU sessions, for example, the binding information includes the session information of the first PDU session, the session information of the second PDU session, . . . , and session information of an Nt PDU session; and the first PDU session is a session established by the first terminal device, the second PDU session is a session established by the second terminal device, and the $N^{th}$ PDU session is a session established by an Nt terminal device. In this case, the air node selects, based on the session information of the first PDU session, the session information of the second PDU session, . . . , and the session information of the $N^{th}$ PDU session, and the local routing node selection information, local routing nodes that respectively provide local routing services for the first terminal device, the second terminal device, . . . , and the Nih terminal device. The N terminal devices may correspond to one or more local routing nodes.

S605: The air node sends first routing information to the first local routing node, where the first routing information includes the group ID and an air interface identifier of the first terminal device, or the routing information includes the group ID, the air interface identifier of the first terminal device, and a local routing rule, the local routing rule is used to indicate the first local routing node to perform local routing, and the air interface identifier of the first terminal device is determined based on the session information of the first PDU session.

Specifically, the session information of the first PDU session includes the one or more of the session ID, the tunnel endpoint identifier TEID, and the flow identifier QFIs of the first PDU session. A possible implementation of determining the air interface identifier of the first terminal device based on the session information of the first PDU session may be: The air node stores the mapping relationship between an air interface bearer (DRB ID identifier) and a QoS flow (QFI). After obtaining the session information in the binding information, the air node may obtain the air interface identifier based on the mapping between a DRB and a Qos flow.

In the foregoing three possible implementations of S604, after the air node selects the first local routing node and the second local routing node, on a basis of S605, the method in this embodiment may further include: The air node sends second routing information to the second local routing node. The second routing information includes the group ID, the air interface identifier of the first terminal device, and the air interface identifier of the second terminal device, or the second routing information includes the group ID, the air interface identifier of the first terminal device, the air interface identifier of the second terminal device, and a local routing rule, and the local routing rule is used by the second local routing node to perform local routing.

It should be noted that, it is assumed that the binding information includes session information of a plurality of PDU sessions, for example, the binding information includes the session information of the first PDU session, the session information of the second PDU session, . . . , and the session information of the $N^{th}$ PDU session; and the first PDU session is a session established by the first terminal device, the second PDU session is a session established by the second terminal device, and the $N^{th}$ PDU session is a session established by the $N^{th}$ terminal device. In this case, after selecting one or more local routing nodes in S105, the first access network node sends routing information to each selected local routing node. The routing information includes the group ID and air interface identifiers of all the terminal devices corresponding to all the session information in the binding information, or the routing information includes the group ID, the air interface identifiers of all the terminal devices corresponding to all the session information in the binding information, and a local routing rule.

Optionally, the first routing information further includes the local switching indication.

It should be noted that, in S604, the air node selects the first local routing node based on the session information of the first PDU session and the local routing node selection information. The selected first local routing node may alternatively be the air node. If the air node is selected, S605 may be omitted.

S606: The first local routing node receives user plane data sent by the first terminal device.

In this embodiment, the first routing node may be an IAB node.

S607: The first local routing node determines, based on the air interface identifier of the first terminal device, a group to which the first terminal device belongs, and obtains the corresponding local routing rule through matching based on the group.

The air interface identifier of the first terminal device may be any identifier that can uniquely identify the first terminal, for example, a data radio bearer identifier (DRB ID)/signaling radio bearer identifier (SRB ID), a DU ID, or a cell radio network temporary identifier (C-RNTI).

S608: The first local routing node forwards the user plane data according to the local routing rule and the local switching indication.

In a possible implementation, the method in this embodiment may further include the following steps:

The first local routing node receives the local switching indication sent by the air node, and the first local routing node generates the local routing rule. A passive generation manner may be used: Each time user plane data sent by the terminal device enters the first local routing node, the first local routing node checks a PDU layer data header. If a user plane performs communication through industrial Ethernet, information such as a source/destination MAC address is obtained; or if a user plane performs communication through an IP protocol, information such as a source/destination IP address is obtained, and a correspondence between a source address and an uplink radio link control (RLC) logical channel identifier (LCID) is generated. In this case, the local routing rule includes the correspondence between a source terminal address and an uplink RLC channel.

Alternatively, an active generation manner may be used: The first local routing node actively obtains an IP address or a MAC address of the first local routing node from a group member, and stores a correspondence between an IP address or a MAC address and a communications channel LCID. In this case, the local routing rule includes the correspondence.

It should be noted that, regardless of the passive manner or the active manner, when the terminal device is customer-premises equipment (CPE), a plurality of IP/MAC addresses may be obtained, in other words, there is a one-to-many relationship between an LCID and IP/MAC addresses.

In another possible implementation, the method in this embodiment may further include: The first local routing node receives the local routing rule and the local switching indication that are sent by the air node. In this manner, the local routing rule is generated by the air node and then sent to the first local routing node. A manner in which the air node generates the local routing rule may be: The air node actively obtains an IP address or a MAC address of the air node from a group member, and stores a correspondence between an IP address or a MAC address and a communications channel LCID. In this case, the local routing rule includes the correspondence.

In this embodiment, the local switching indication is an Ethernet layer switching indication or an internet protocol layer switching indication. S609 may be specifically as follows:

If the local switching indication is the Ethernet layer switching indication, a local routing node removes a PDCP/SDAP packet header in which user plane data is located, and forwards, to an industrial Ethernet/IP network through switch forwarding, data obtained by removing the PDCP/SDAP packet header.

If the local switching indication is the internet protocol layer switching indication, a local routing node removes a PDCP/SDAP packet header or a MAC header, and then forwards, to an industrial Ethernet/IP network through a router, data obtained by removing the PDCP/SDAP packet header or the MAC header.

According to the data transmission method provided in this embodiment, after receiving the first message sent by the first terminal device, when determining, based on the group information corresponding to the first terminal device, that the first terminal device needs to perform local routing, the air node obtains the binding information including the group ID and the session information of the first PDU session, then selects, based on the session information of the first PDU session and the local routing node selection information, the first local routing node that provides the local routing service for the first terminal device, and sends the first routing information to the first local routing node. The first local routing node may be an IAB node. Therefore, after receiving the user plane data sent by the first terminal device, the first local routing node determines, based on the air interface identifier of the first terminal device, the group to which the first terminal device belongs, obtains the corresponding local routing rule through matching based on the group, and finally forwards the user plane data according to the local routing rule and the local switching indication. In this way, IAB based local routing can be implemented, so that user plane data can be directly forwarded inside an IAB node or between IAB nodes. This can shorten a transmission latency to a maximum extent, and implement local data closed-loop.

After a local routing group is established by using the solution shown in FIG. 8, group update, group query, group deletion, and the like may further exist subsequently. The following describes in detail a group update process, a group query process, and a group deletion process with reference to FIG. 9A and FIG. 9B.

Figure 9A:
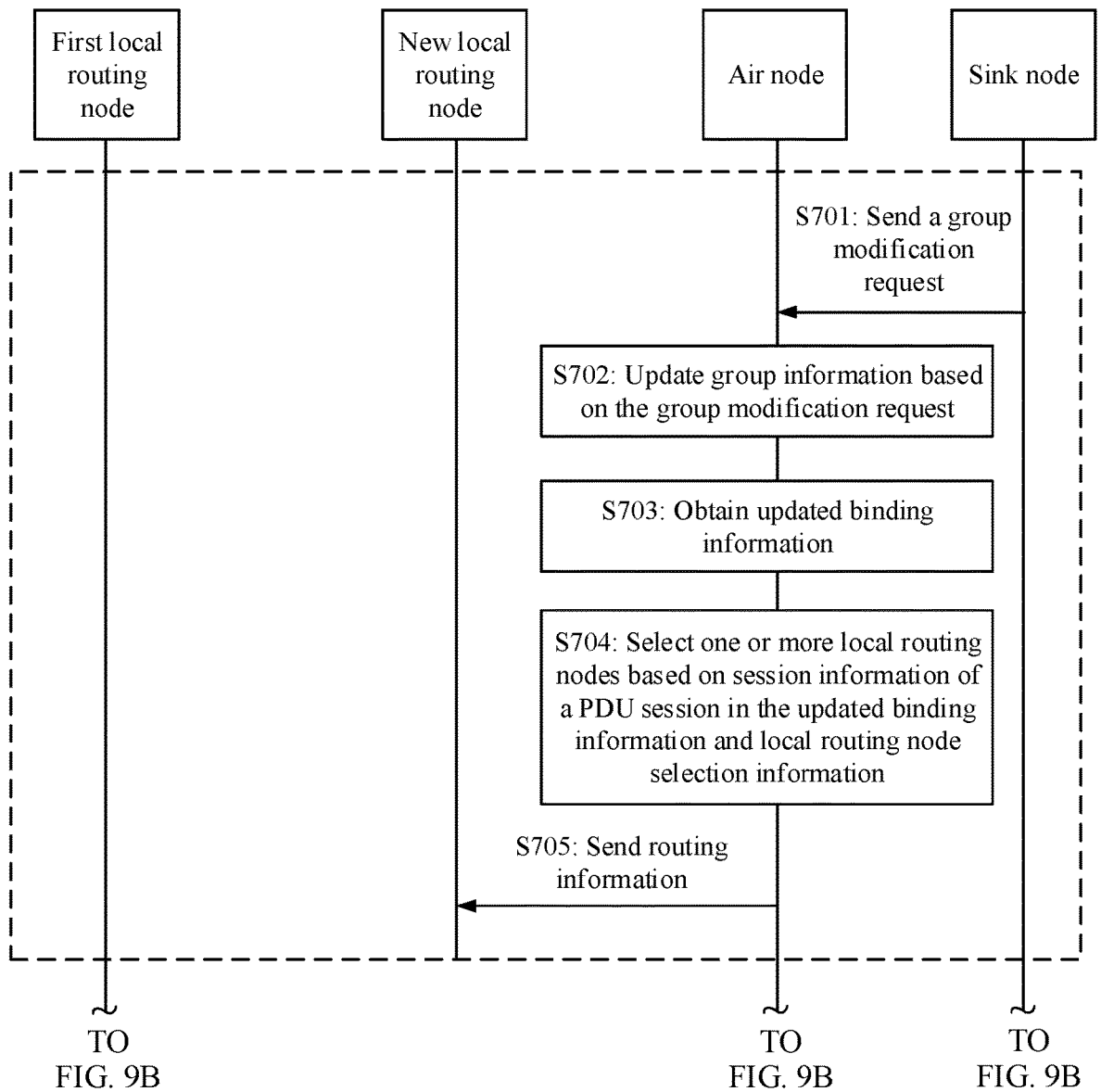
FIG. 9A and FIG. 9B are an interaction flowchart of an embodiment of a data transmission method according to this application.
Figure 9B:
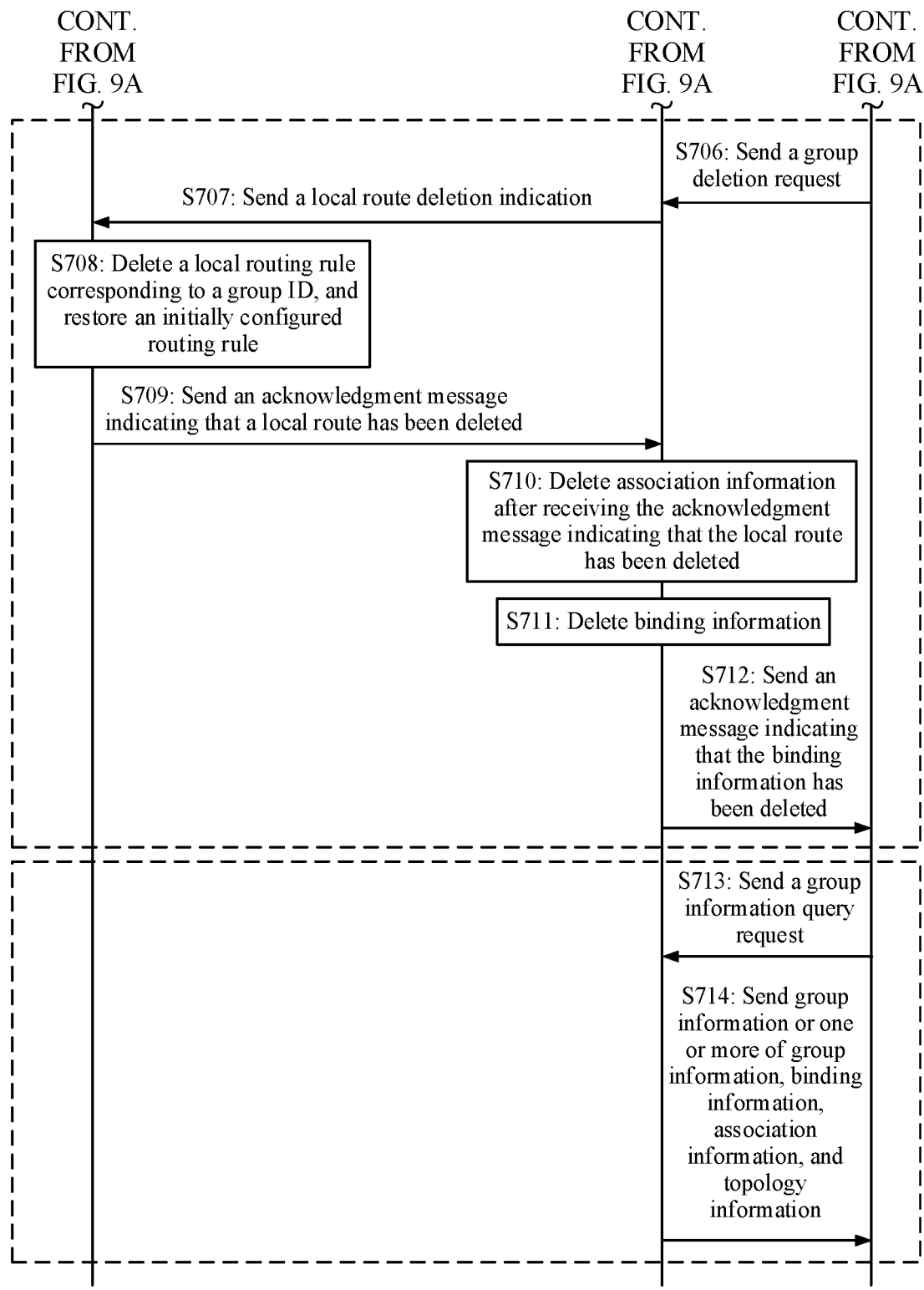

FIG. 9A and FIG. 9B are an interaction flowchart of an embodiment of a data transmission method according to this application. As shown in FIG. 9A and FIG. 9B, the method in this embodiment may include the following steps.

S701: An air node receives a group modification request sent by a sink node, where the group modification request includes any one or more of a group ID, an updated group member list, an updated local routing node list, an updated local switching indication, and an updated service identifier.

In other words, if any one or more of the group ID, a group member list, a local routing node list, a local switching indication, and a service identifier are updated, a group is also updated.

S702: The air node updates group information based on the group modification request.

S703: The air node obtains updated binding information.

Specifically, binding is binding the group information to session information of a PDU session. When the group information changes, binding information is also updated, and the binding information is uniquely identified by a group ID. The updated binding information includes the group ID and the session information of the PDU session.

S704: The air node selects one or more local routing nodes based on the session information of the PDU session in the updated binding information and local routing node selection information, where a local routing node provides a local routing service for a terminal device corresponding to the PDU session.

If a selected local routing node is different from a source local routing node, the method in this embodiment further includes the following step:

S705: The air node sends routing information to the one or more selected local routing nodes, where the routing information includes the group ID and air interface identifiers of all terminal devices corresponding to session information of PDU sessions in the updated binding information, or the routing information includes the group ID, the air interface identifiers of all the terminal devices corresponding to the session information of the PDU sessions in the updated binding information, and a local routing rule.

A subsequent procedure of processing a local routing node is the same as the procedure of processing the first local routing node in S606 to S608. Details are not described herein again.

According to the data transmission method provided in this embodiment, after receiving the group modification request sent by the sink node, the air node updates the group information based on the group modification request, and obtains the updated binding information. This implements local routing group update.

A group deletion procedure is as follows:

S706: The air node receives a group deletion request sent by the sink node, where the group deletion request includes the group ID that is requested to be deleted.

S707: The air node sends a local route deletion indication to the first local routing node, where the local route deletion indication includes the group ID that is requested to be deleted.

If there are two local routing nodes, S707 is: The air node sends the local route deletion indication to the first local routing node and/or a second local routing node.

The following uses the first routing node as an example, and a processing process of a second routing node is similar.

S708: After receiving the local route deletion indication, the first local routing node deletes a local routing rule corresponding to the group ID, and restores an initially configured routing rule.

S709: After successfully deleting the local routing rule, the first local routing node sends, to the air node, an acknowledgment message indicating that a local route has been deleted.

S710: After receiving the acknowledgment message indicating that the local route has been deleted, the air node deletes association information, where the association information includes the group ID and the local routing node list.

S711: The air node deletes the binding information.

S712: The air node sends, to the sink node, an acknowledgment message indicating that the binding information has been deleted.

The data transmission method provided in this embodiment implements group deletion.

A group query procedure is as follows:

S713: The air node receives a group information query request sent by the sink node, where the group information query request includes the group ID.

S714: The air node sends the group information or one or more of the group information, the binding information, association information, and topology information to the sink node.

The data transmission method provided in this embodiment implements group query. It should be noted that there is no association between and there is no sequence of performing the group query procedure in S713 and S714 and the foregoing group query procedure and the foregoing group modification procedure.

The following uses several specific embodiments to describe in detail the technical solutions of the method embodiments shown in FIG. 8, and FIG. 9A and FIG. 9B.

Figure 10A:
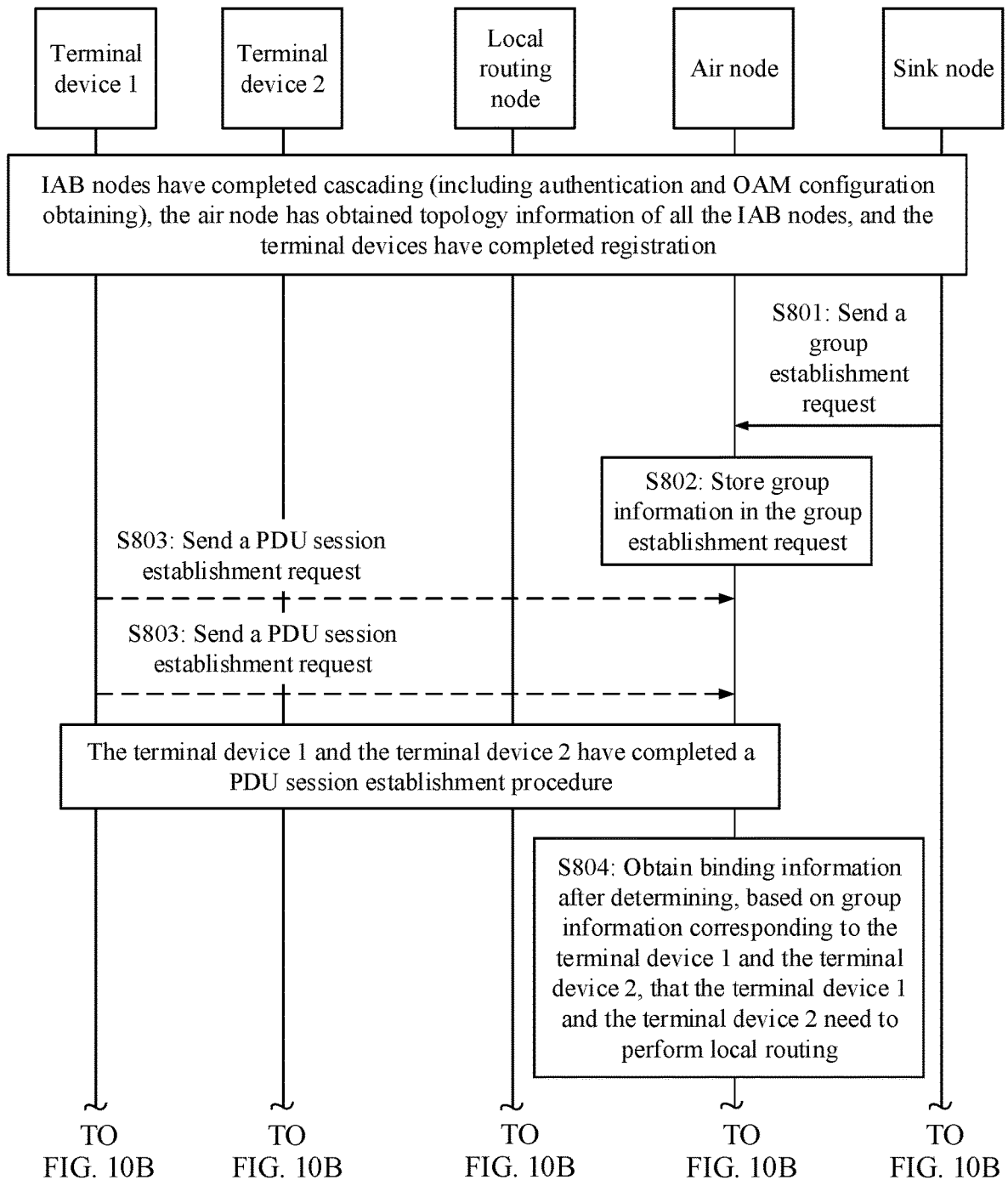
FIG. 10A and FIG. 10B are a flowchart of an embodiment of a data transmission method according to this application.
Figure 10B:
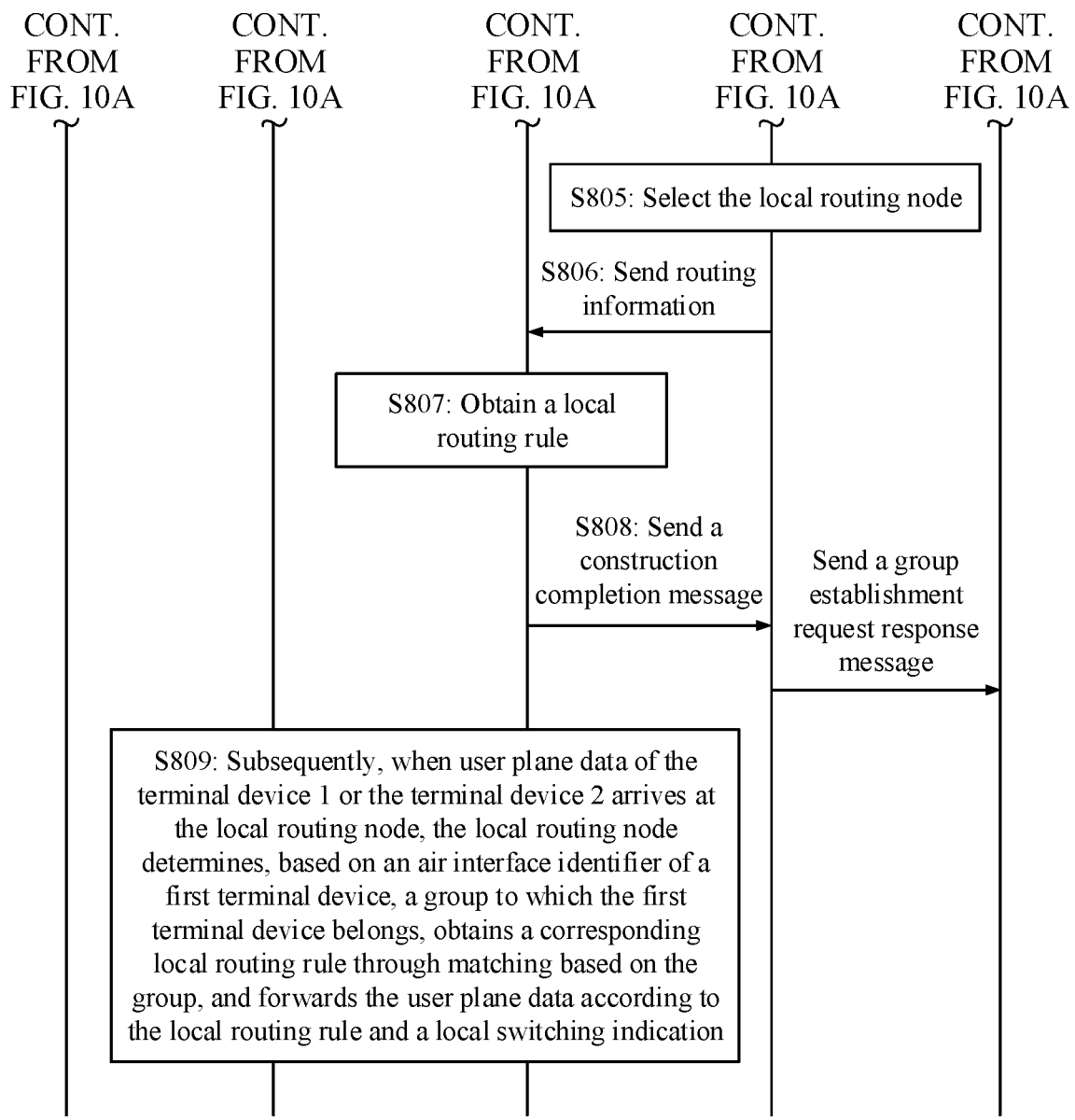

FIG. 10A and FIG. 10B are a flowchart of an embodiment of a data transmission method according to this application. As shown in FIG. 10A and FIG. 10B, the method in this embodiment may include the following steps.

S801: A sink node sends a group establishment request to an air node to request to establish a local route.

Before S801, IAB nodes have completed a cascading procedure (including completing a NAS authentication procedure, and completing a cascading sub-procedure, for example, obtaining OAM configuration information through a user plane), the air node has obtained topology information of all the IAB nodes, and terminal devices have completed registration.

Specifically, the group establishment request includes a group ID, and may further include a local switching indication. The local switching indication is an Ethernet layer switching indication or an internet protocol (IP) layer switching indication, and is used to indicate whether local switching is performed based on an Ethernet layer or an IP layer. Optionally, the group establishment request may further include a group member list, a local routing node list, and other group-related parameters. The group member list may be further preconfigured in the air node (for example, a unified data management (UDM) network element/a unified data repository (UDR)). The group member list may be represented in the following form: a GPSI, an IMSI/IMEI, or a RAN side terminal device identifier (such as a DRB ID or an LCID).

The local routing node list is used as a reference for selection by the air node. A specific form of a local routing node may be an air node ID. The sink node has a network management function. Network management personnel may determine an appropriate local routing node based on a visualized interface (including an IAB topology) provided by the sink node, to directly construct a group.

The other group-related parameters include, for example, group-associated DNN information and PDU session type information of a group member.

S802: The air node stores group information in the group establishment request.

S803: A terminal device 1 and a terminal device 2 separately send a PDU session establishment request to the air node, where the PDU session establishment request carries a PDU session ID and a special DNN.

S804: When or after the terminal device 1 and the terminal device 2 establish PDU session requests, the air node obtains binding information after the air node determines, based on group information corresponding to the terminal device 1 and the terminal device 2, that the terminal device 1 and the terminal device 2 need to perform local routing, where the binding information includes the group ID, session information of a first PDU session, and session information of a second PDU session, and session information includes one or more of a session ID, a tunnel endpoint identifier TEID, and a flow identifier QFIs of a PDU session.

S805: Select a local routing node, where specifically, if the group establishment request further includes the local routing node list, the air node first checks, based on an IAB topology relationship, and capability information and configuration information of a local routing node in the local routing node list, whether the specified local routing node meets a condition.

If the condition is met, routing information and the selected local routing node are obtained. There may be one or two selected local routing nodes. If there is one local routing node, the routing information includes the group ID, an air interface identifier of the terminal device 1, and an air interface identifier of the terminal device 2, or the routing information includes the group ID, the air interface identifier of the terminal device 1, the air interface identifier of the terminal device 2, and a local routing rule.

If the condition is not met, the air node re-selects a local routing node based on the IAB topology relationship and selection policy information. An example of a tree IAB topology is used. A selection method in an embodiment is: selecting a minimum common parent node of a terminal device in a group as a local routing node. After the selection is completed, routing information and the selected local routing node are also obtained. There may be one or two selected local routing nodes. If there is one local routing node, the routing information includes the group ID, an air interface identifier of the terminal device 1, and an air interface identifier of the terminal device 2, or the routing information includes the group ID, the air interface identifier of the terminal device 1, the air interface identifier of the terminal device 2, and a local routing rule.

S806: The air node sends the routing information to the local routing node, where the routing information includes the group ID, the air interface identifier of the terminal device 1, and the air interface identifier of the terminal device 2, or the routing information includes the group ID, the air interface identifier of the terminal device 1, the air interface identifier of the terminal device 2, and the local routing rule, the local routing rule is optional, the local routing node may generate the local routing rule based on a local routing indication and a group attribute, and the local routing rule may include priority information to ensure that the local routing rule is preferentially executed.

S807: The local routing node obtains the local routing rule. After the local routing node receives the routing information sent by the air node, if the routing information includes the local routing rule, the local routing node updates the local routing rule according to the local routing rule included in the routing information, or generates the local routing rule according to the local switching indication, and enables a capability of a switch or a capability of a route, for example, a MAC address learning function or an IP address learning function. In addition, the local routing node determines a local switching type according to the local switching indication, in other words, determines whether local switching is performed based on a MAC layer or the IP layer.

S808: After a local route is successfully constructed, the local routing node sends a construction completion message to the air node, and the air node sends a group establishment request response message to the sink node.

S809: Subsequently, when user plane data of the terminal device 1 or the terminal device 2 arrives at the local routing node, the local routing node determines, based on an air interface identifier of a first terminal device, a group to which the first terminal device belongs, obtains a corresponding local routing rule through matching based on the group, and forwards the user plane data according to the local routing rule and the local switching indication.

Specifically, if the local switching indication is the Ethernet layer switching indication, a local routing node removes a PDCP/SDAP packet header in which user plane data is located, and forwards, to an industrial Ethernet/IP network through switch forwarding, data obtained by removing the PDCP/SDAP packet header.

If the local switching indication is the internet protocol layer switching indication, a local routing node removes a PDCP/SDAP packet header or a MAC header, and then forwards, to an industrial Ethernet/IP network through a router, data obtained by removing the PDCP/SDAP packet header or the MAC header.

Figure 11A:
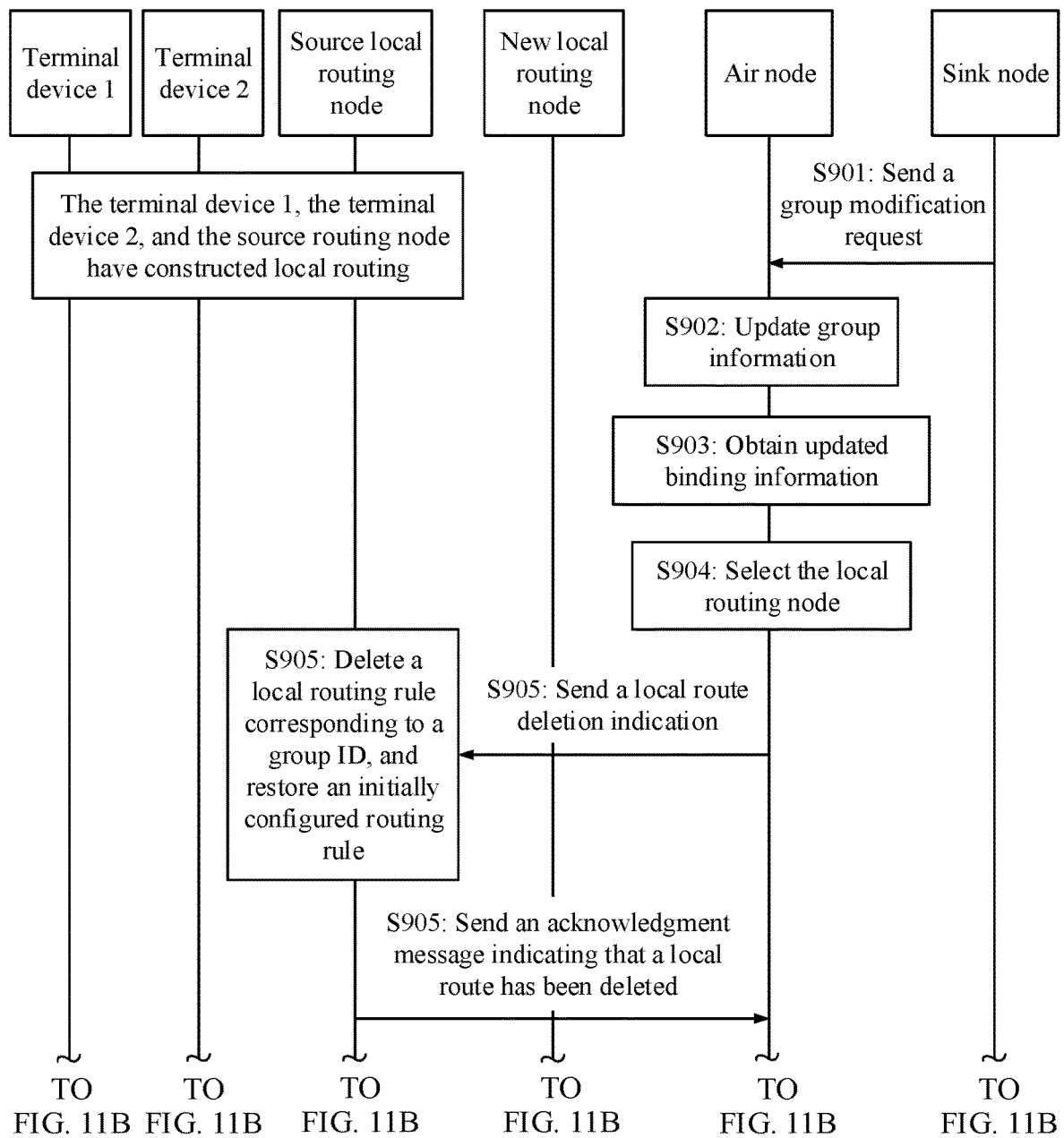
FIG. 11A and FIG. 11B are a flowchart of an embodiment of a data transmission method according to this application.
Figure 11B:
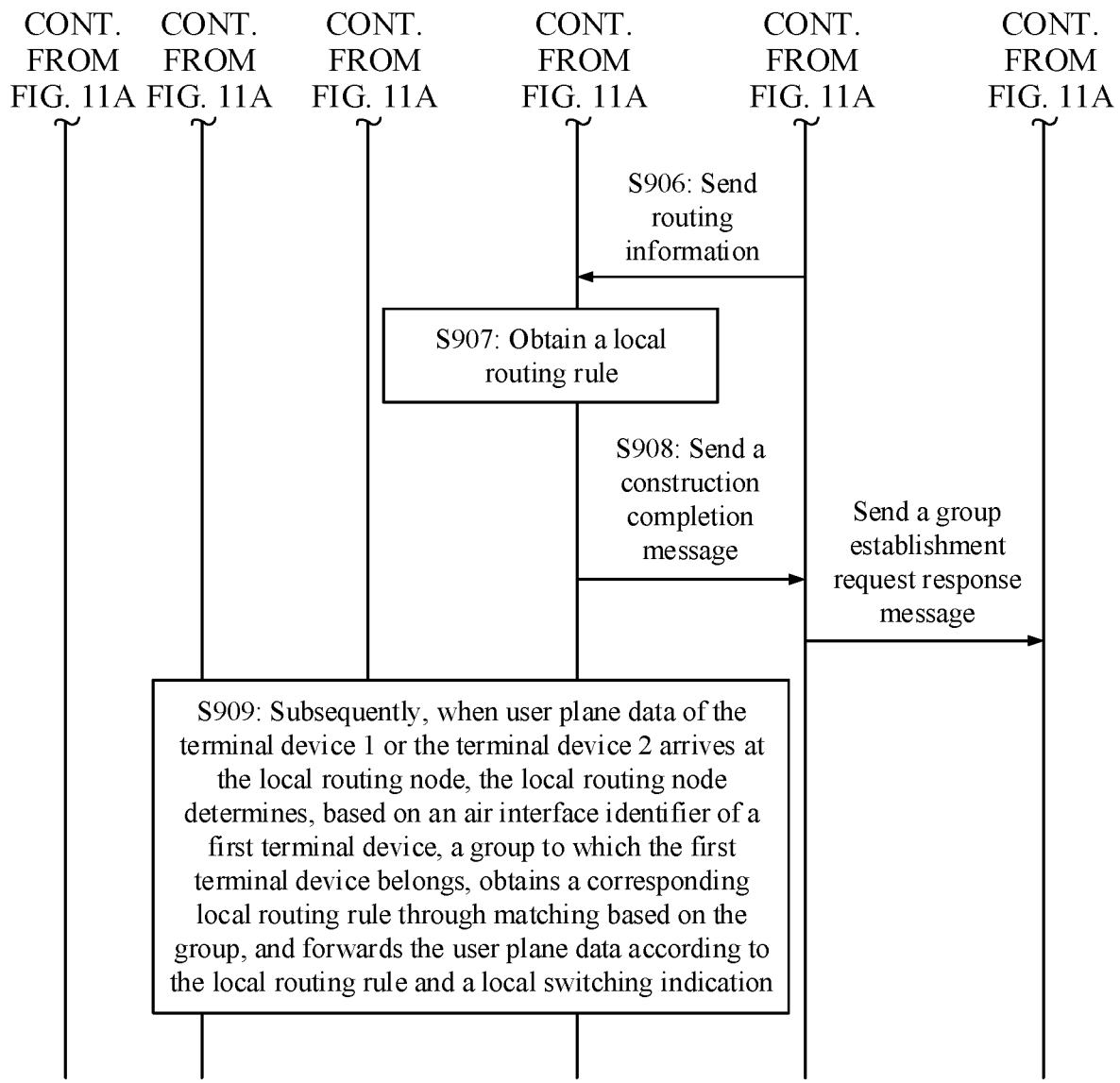

According to the procedure shown in FIG. 10A and FIG. 10B, the terminal device 1, the terminal device 2, and the local routing node have established local routes. The following describes a group update process with reference to FIG. 11A and FIG. 11B. FIG. 11A and FIG. 11B are a flowchart of an embodiment of a data transmission method according to this application. As shown in FIG. 11A and FIG. 11B, the method in this embodiment may include the following steps.

S901: A sink node sends a group modification request to an air node to request to modify a local route.

Specifically, the group modification request includes a group ID and an updated group member list. Optionally, the group modification request further includes a local switching indication used to indicate whether local switching is performed based on a MAC layer or an IP layer. The updated group member list may be represented in a form of a GPSI, an IMSI/IMEI, or a RAN side terminal device identifier (for example, a DRB ID or an LCID).

Optionally, the group modification request may further include an updated local routing node list and other group-related parameters.

The updated local routing node list is used as a reference for selection by the air node. A specific form of a local routing node may be an IAB node ID.

The other group-related parameters include, for example, group-associated DNN information and PDU session type information of a group member.

S902: The air node stores group information in the group modification request, and may specifically update the stored group information based on the group ID.

S903: The air node obtains updated binding information.

Specifically, during actual group modification, a group member may change. In this embodiment, assuming that a group member does not change, it means that a specified local routing node, a local switching indication, or other parameter information changes.

S904: The air node selects a local routing node. If the group modification request further includes the updated local routing node list, the air node first checks, based on an IAB topology relationship, and capability information and configuration information of a local routing node in the local routing node list, whether the specified local routing node meets a condition.

If the condition is met, routing information and the selected local routing node are obtained. There may be one or two selected local routing nodes. If there is one local routing node, the routing information includes the group ID, an air interface identifier of the terminal device 1, and an air interface identifier of the terminal device 2, or the routing information includes the group ID, the air interface identifier of the terminal device 1, the air interface identifier of the terminal device 2, and a local routing rule.

If the condition is not met, the IAB donor node re-selects a local routing node based on the IAB topology relationship and selection policy information. An example of a tree IAB topology is used. A selection method in an embodiment is: selecting a minimum common parent node of a terminal device in a group as a local routing node. After the selection is completed, routing information and the selected local routing node are also obtained. There may be one or two selected local routing nodes. If there is one local routing node, the routing information includes the group ID, an air interface identifier of the terminal device 1, and an air interface identifier of the terminal device 2, or the routing information includes the group ID, the air interface identifier of the terminal device 1, the air interface identifier of the terminal device 2, and a local routing rule.

S905: If the local routing node selected by the air node in S904 is different from a source local routing node, the air node first sends a local route deletion indication to the source local routing node, where the local route deletion indication includes the group ID that is requested to be deleted. Therefore, after receiving the local route deletion indication, the source local routing node deletes a local routing rule corresponding to the group ID, and restores an initially configured routing rule. After successfully deleting the local routing rule, the source local routing node sends, to the IAB donor node, an acknowledgment message indicating that a local route has been deleted.

S906: The air node sends the routing information to the newly selected local routing node, where the routing information includes the group ID, the air interface identifier of the terminal device 1, and the air interface identifier of the terminal device 2, or the routing information includes the group ID, the air interface identifier of the terminal device 1, the air interface identifier of the terminal device 2, and the local routing rule.

The following procedures of S907 to S909 are the same as S807 to S809 shown in FIG. 10A and FIG. 10B. Details are not described herein again.

Figure 12A:
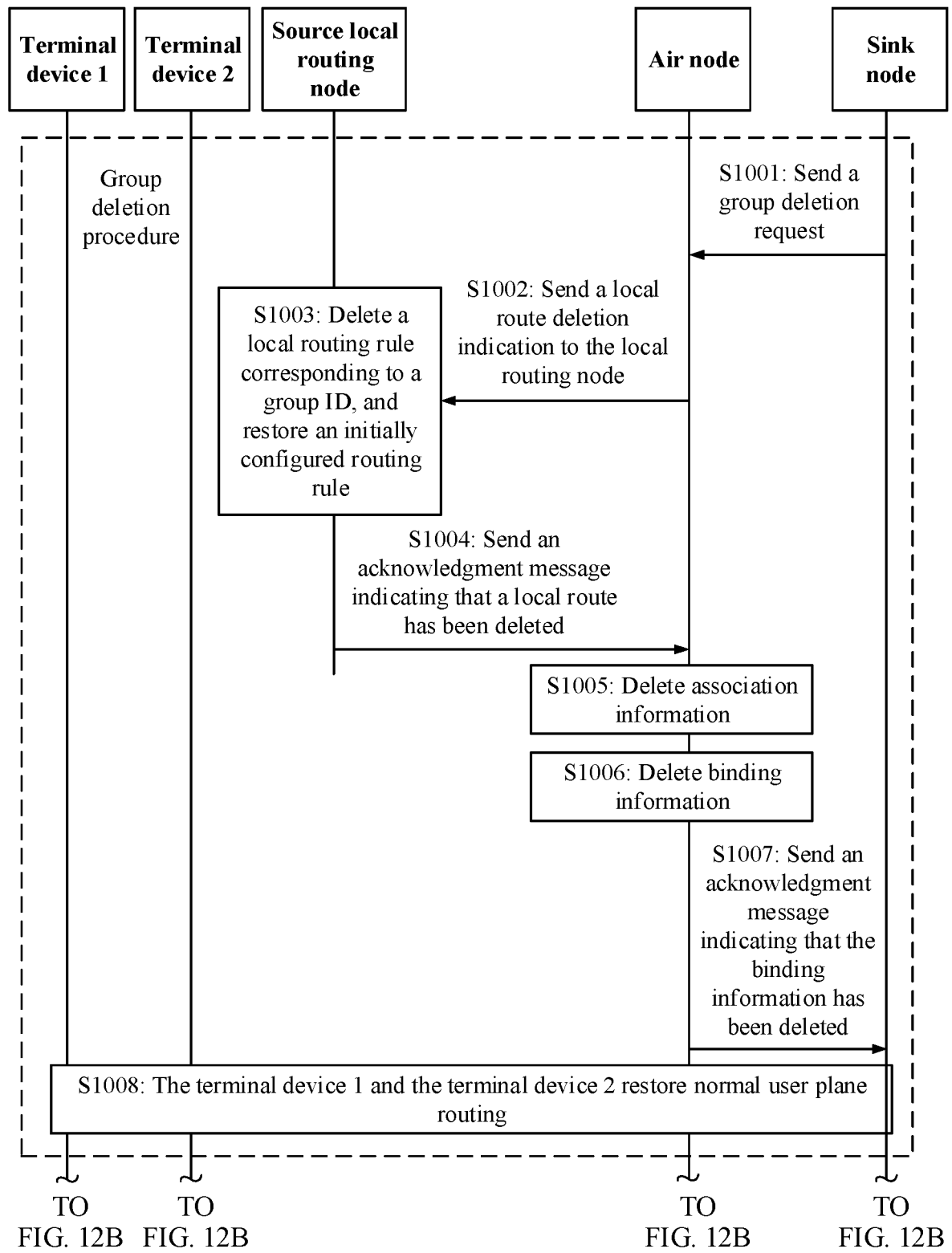
FIG. 12A and FIG. 12B are a flowchart of an embodiment of a data transmission method according to this application.
Figure 12B:
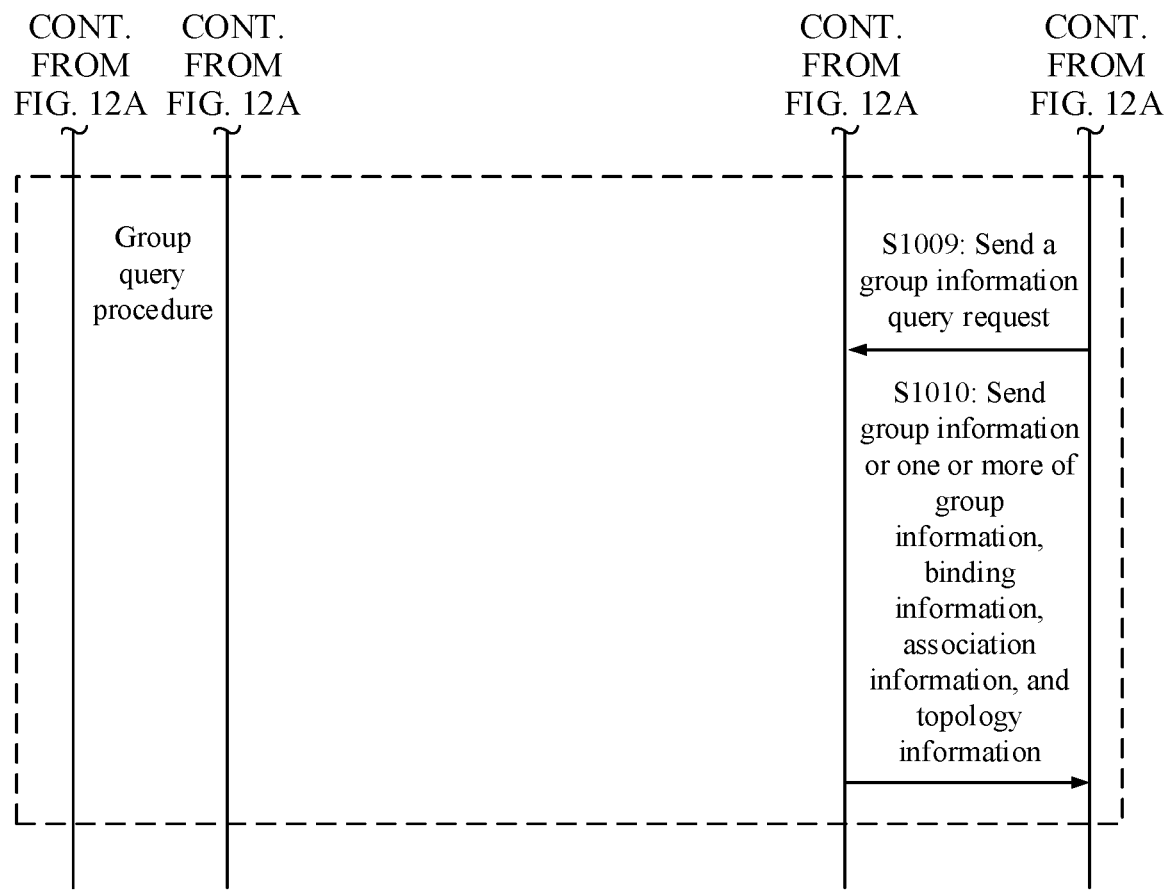

FIG. 12A and FIG. 12B are a flowchart of an embodiment of a data transmission method according to this application. As shown in FIG. 12A and FIG. 12B, the method in this embodiment may include the following steps.

S1001: A sink node sends a group deletion request to an air node to request to delete a local route, where the group deletion request includes a group ID that is requested to be deleted.

S1002: The air node sends a local route deletion indication to a local routing node, where the local route deletion indication includes the group ID that is requested to be deleted.

S1003: After receiving the local route deletion indication, the local routing node deletes a local routing rule corresponding to the group ID, and restores an initially configured routing rule.

S1004: After successfully deleting the local routing rule, the local routing node sends, to the air node, an acknowledgment message indicating that a local route has been deleted.

S1005: After receiving the acknowledgment message indicating that the local route has been deleted, the air node deletes association information, where the association information includes the group ID and a local routing node list.

S1006: The air node deletes binding information.

S1007: The air node sends, to the sink node, an acknowledgment message indicating that the binding information has been deleted.

S1008: A terminal device 1 and a terminal device 2 restore normal user plane routing.

A group query procedure is as follows:

S1009: The sink node sends a group information query request to the air node, where the group information query request includes the group ID.

S1010: The air node sends group information or one or more of group information, binding information, association information, and topology information to the sink node.

Figure 13:
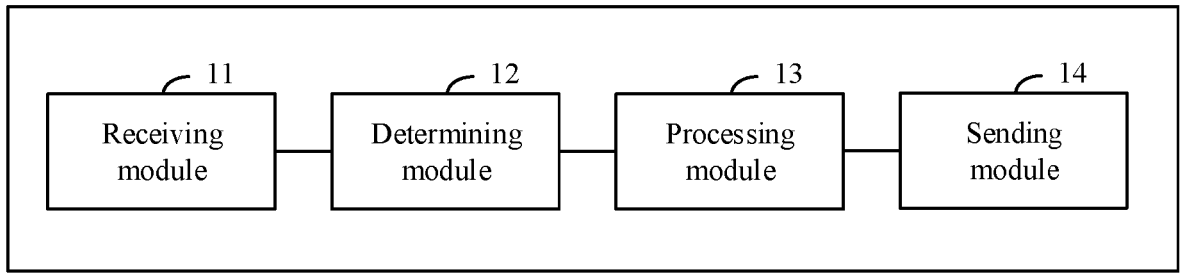
FIG. 13 is a schematic diagram of a structure of an embodiment of a data transmission apparatus according to this application.

FIG. 13 is a schematic diagram of a structure of an embodiment of a data transmission apparatus according to this application. As shown in FIG. 13, the apparatus in this embodiment may include a receiving module 11, a determining module 12, a processing module 13, and a sending module 14. The receiving module 11 is configured to receive a first message sent by a first terminal device, where the first message is used to request to establish a first protocol data unit PDU session.

The determining module 12 is configured to determine, based on group information corresponding to the first terminal device, that the first terminal device needs to perform local routing, where the group information includes a group identifier ID and a group member list.

The processing module 13 is configured to obtain binding information, where the binding information includes the group ID and session information of the first PDU session, and the session information includes one or more of a session ID, a tunnel endpoint identifier TEID, and a flow identifier QFIs of the first PDU session.

The sending module 14 is configured to send the binding information to a first access network node.

Optionally, the determining module 12 is configured to:

determine, based on the group information corresponding to the first terminal device and the service identifier, that the first terminal device needs to perform local routing.

Optionally, the service identifier includes the session ID of the first PDU session and/or a data network name DNN, and the determining module 12 is configured to determine, based on the group information corresponding to the first terminal device and the session ID of the first PDU session and/or the DNN, that the first terminal device needs to perform local routing.

Optionally, the receiving module 11 is further configured to receive a group establishment request sent by an AF, where the group establishment request includes the group ID.

The processing module 13 is further configured to store the group ID in the group information.

Optionally, the group establishment request further includes the group member list and/or a local routing node list.

Optionally, the sending module 14 is further configured to send the local routing node list to the first access network node.

Optionally, the group establishment request further includes a local switching indication, and the sending module 14 is further configured to:

send the local switching indication to the first access network node.

Optionally, the receiving module 11 is further configured to receive a group modification request sent by an AF, where the group modification request includes any one or more of the group ID, an updated group member list, an updated local routing node list, an updated local switching indication, and an updated service identifier.

The processing module 13 is further configured to: update the group information based on the group modification request; and obtain updated binding information, where the updated binding information includes the group ID and session information of at least one updated PDU session.

The sending module 14 is further configured to send the updated binding information to the first access network node.

Optionally, the sending module 14 is further configured to:

send the updated local routing node list and/or the updated local switching indication to the first access network node.

Optionally, the receiving module 11 is further configured to receive a group deletion request sent by an AF, where the group deletion request includes the group ID that is requested to be deleted.

The sending module 14 is further configured to send the group deletion request to the first access network node.

The processing module 13 is further configured to delete the binding information after the receiving module receives acknowledgment information that is sent by the first access network node and that indicates that association information has been deleted, where the association information includes the group ID and a local routing node list.

The sending module 14 is further configured to send, to the AF, an acknowledgment message indicating that the binding information has been deleted.

Optionally, the receiving module 11 is further configured to receive a group information query request sent by an AF, where the group information query request includes the group ID.

The sending module 14 is further configured to send the group information and/or the binding information to the AF.

Optionally, the sending module 14 is further configured to send an association information request and/or a topology information request to the first access network node.

The receiving module 11 is further configured to receive association information and topology information that are sent by the first access network node, where the association information includes the group ID and a local routing node list.

The sending module 14 is further configured to send the association information and/or the topology information to the AF.

The apparatus in this embodiment may be configured to execute the technical solutions in the method embodiments shown in FIG. 2, and FIG. 3A and FIG. 3B, and implementation principles and technical effects thereof are similar. Details are not described herein.

Figure 14:
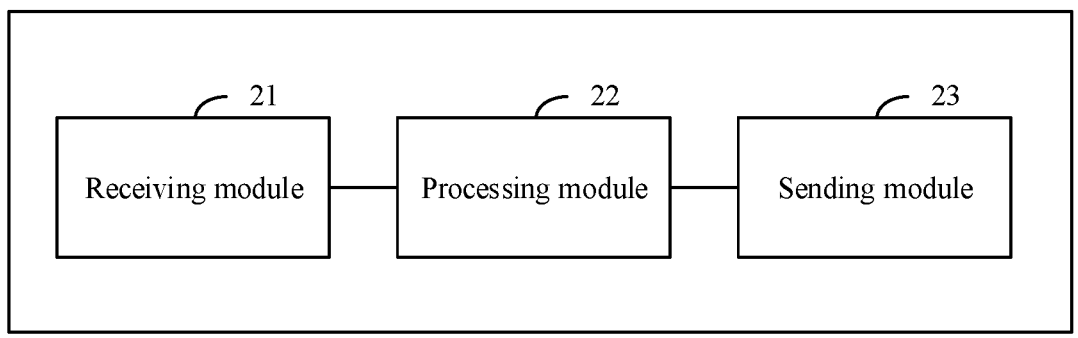
FIG. 14 is a schematic diagram of a structure of an embodiment of a data transmission apparatus according to this application.

FIG. 14 is a schematic diagram of a structure of an embodiment of a data transmission apparatus according to this application. As shown in FIG. 14, the apparatus in this embodiment may include a receiving module 21, a processing module 22, and a sending module 23.

The receiving module 21 is configured to receive binding information sent by a core network element, where the binding information includes a group identifier ID and session information of a first protocol data unit PDU session, and the first PDU session is a session established by a first terminal device.

The processing module 22 is configured to select a first local routing node based on the session information of the first PDU session and local routing node selection information, where the first local routing node provides a local routing service for the first terminal device.

The sending module 23 is configured to send first routing information to the first local routing node, where the first routing information includes the group ID and an air interface identifier of the first terminal device, or the routing information includes the group ID, the air interface identifier of the first terminal device, and a local routing rule, the local routing rule is used to indicate the first local routing node to perform local routing, and the air interface identifier of the first terminal device is determined based on the session information of the first PDU session.

Optionally, the binding information further includes session information of a second PDU session, the second PDU session is a session established by a second terminal device, and the selection module 22 is configured to:

select a second local routing node based on the session information of the first PDU session, the session information of the second PDU session, and the local routing node selection information, where the second local routing node provides a local routing service for the second terminal device.

Optionally, the binding information further includes session information of a second PDU session, the second PDU session is a session established by a second terminal device, and the selection module 22 is configured to:

select a second local routing node based on the first local routing node, the session information of the first PDU session, the session information of the second PDU session, and the local routing node selection information, where the second local routing node provides a local routing service for the second terminal device.

Optionally, the binding information further includes session information of a second PDU session, the second PDU session is a session established by a second terminal device, and the selection module 22 is configured to:

select the first local routing node and a second local routing node based on the session information of the first PDU session, the session information of the second PDU session, and the local routing node selection information, where the second local routing node provides a local routing service for the second terminal device.

Optionally, the sending module 23 is further configured to:

send second routing information to the second local routing node, where the second routing information includes the group ID, the air interface identifier of the first terminal device, and an air interface identifier of the second terminal device, or the second routing information includes the group ID, the air interface identifier of the first terminal device, the air interface identifier of the second terminal device, and a local routing rule, and the local routing rule is used by the second local routing node to perform local routing.

Optionally, the local routing node selection information includes one or more of topology information, a selection policy, configuration information, capability information, and a local routing node list sent by the core network element.

Optionally, the receiving module 21 is further configured to:

receive a local switching indication sent by the core network element, where the first routing information further includes the local switching indication.

Optionally, the receiving module 21 is further configured to:

receive a group deletion request sent by the core network element, where the group deletion request includes the group ID that is requested to be deleted.

The sending module 23 is further configured to send a local route deletion indication to the first local routing node, where the local route deletion indication includes the group ID that is requested to be deleted.

The receiving module 21 is further configured to receive an acknowledgment message that is sent by the first local routing node and that indicates that a local route has been deleted.

The processing module 22 is further configured to delete association information, where the association information includes the group ID and the local routing node list. The sending module 23 is further configured to send, to the core network element, acknowledgment information indicating that the association information has been deleted.

Optionally, the receiving module 21 is further configured to receive a group deletion request sent by the core network element, where the group deletion request includes the group ID that is requested to be deleted.

The sending module 23 is further configured to send a local route deletion indication to the first local routing node and/or the second local routing node, where the local route deletion indication includes the group ID that is requested to be deleted.

The receiving module 21 is further configured to receive an acknowledgment message that is sent by the first local routing node and/or the second local routing node and that indicates that a local route has been deleted.

The processing module 22 is further configured to delete association information, where the association information includes the group ID and the local routing node list.

The sending module 23 is further configured to send, to the core network element, acknowledgment information indicating that the association information has been deleted.

Optionally, the processing module 22 is further configured to generate the local routing rule after the receiving module receives the binding information sent by the core network element.

The apparatus in this embodiment may be configured to execute the technical solutions in the method embodiments shown in FIG. 2, and FIG. 3A and FIG. 3B, and implementation principles and technical effects thereof are similar. Details are not described herein.

Figure 15:
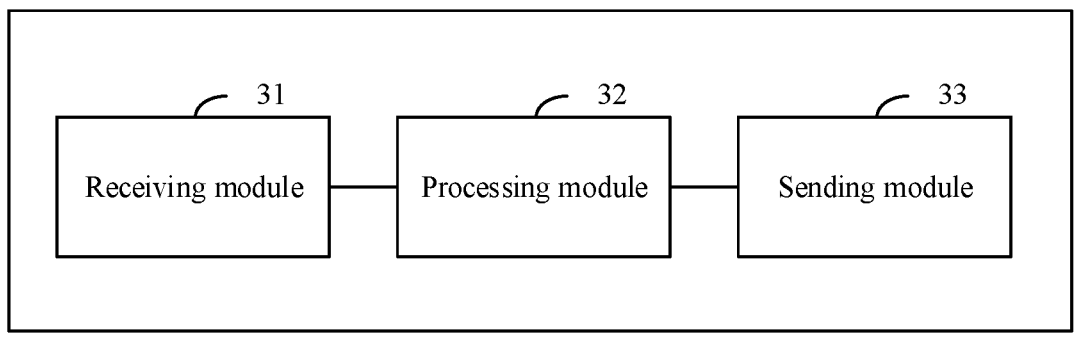
FIG. 15 is a schematic diagram of a structure of an embodiment of a data transmission apparatus according to this application.

FIG. 15 is a schematic diagram of a structure of an embodiment of a data transmission apparatus according to this application. As shown in FIG. 15, the apparatus in this embodiment may include a receiving module 31, a processing module 32, and a sending module 33.

The receiving module 31 is configured to receive routing information sent by a first access network node, where the first routing information includes a group identifier ID and an air interface identifier of a first terminal device, or the routing information includes the group ID, the air interface identifier of the first terminal device, and a local routing rule, and the local routing rule is used to indicate the local routing node to perform local routing.

The receiving module 31 is further configured to receive user plane data sent by the first terminal device.

The processing module 32 is configured to: determine, based on the air interface identifier of the first terminal device, a group to which the first terminal device belongs, and obtain the corresponding local routing rule through matching based on the group.

The sending module 33 is configured to forward the user plane data according to the local routing rule and a local switching indication.

Optionally, the receiving module 31 is further configured to receive the local switching indication sent by the first access network node; and the processing module 32 is further configured to generate the local routing rule; or the receiving module 31 is further configured to receive the local routing rule and the local switching indication that are sent by the first access network node.

Optionally, the receiving module 31 is further configured to receive a local route deletion indication sent by the first access network node, where the local route deletion indication carries the group ID that is requested to be deleted.

The processing module 32 is further configured to: delete the local routing rule corresponding to the group ID, and restore an initially configured routing rule.

Optionally, the local switching indication is an Ethernet layer switching indication or an internet protocol layer switching indication.

The apparatus in this embodiment may be configured to execute the technical solutions in the method embodiments shown in FIG. 2, and FIG. 3A and FIG. 3B, and implementation principles and technical effects thereof are similar. Details are not described herein.

Figure 16:
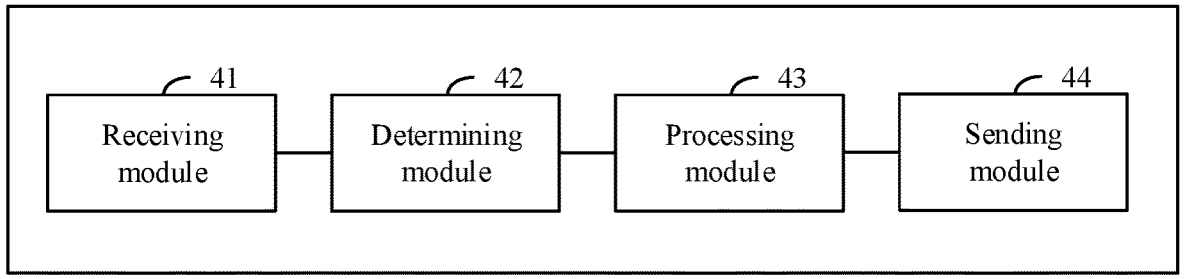
FIG. 16 is a schematic diagram of a structure of an embodiment of a data transmission apparatus according to this application.

FIG. 16 is a schematic diagram of a structure of an embodiment of a data transmission apparatus according to this application. As shown in FIG. 16, the apparatus in this embodiment may include a receiving module 41, a determining module 42, a processing module 43, and a sending module 44.

The receiving module 41 is configured to receive a first message sent by a first terminal device, where the first message is used to request to establish a first protocol data unit PDU session.

The determining module 42 is configured to determine, based on group information corresponding to the first terminal device, that the first terminal device needs to perform local routing, where the group information includes a group identifier ID and a group member list.

The processing module 43 is configured to obtain binding information, where the binding information includes the group ID and session information of the first PDU session, and the session information includes one or more of a session ID, a tunnel endpoint identifier TEID, and a flow identifier QFIs of the first PDU session.

The processing module 43 is further configured to select a first local routing node based on the session information of the first PDU session and local routing node selection information, where the first local routing node provides a local routing service for the first terminal device.

The sending module 44 is configured to send first routing information to the first local routing node, where the first routing information includes the group ID and an air interface identifier of the first terminal device, or the routing information includes the group ID, the air interface identifier of the first terminal device, and a local routing rule, the local routing rule is used to indicate the first local routing node to perform local routing, and the air interface identifier of the first terminal device is determined based on the session information of the first PDU session.

Optionally, the first message includes a service identifier, and the determining module 42 is configured to determine, based on the group information corresponding to the first terminal device and the service identifier, that the first terminal device needs to perform local routing.

Optionally, the service identifier includes the session ID of the first PDU session and/or a data network name DNN, and the determining module 42 is configured to determine, based on the group information corresponding to the first terminal device and the session ID of the first PDU session and/or the DNN, that the first terminal device needs to perform local routing.

Optionally, the receiving module 41 is further configured to receive a group establishment request sent by a sink node, where the group establishment request includes the group ID.

The processing module 43 is further configured to store the group ID in the group information.

Optionally, the group establishment request further includes the group member list and/or a local routing node list.

Optionally, the group establishment request further includes a local switching indication.

Optionally, the binding information further includes session information of a second PDU session, the second PDU session is a session established by a second terminal device, and the processing module 43 is configured to:

select a second local routing node based on the session information of the first PDU session, the session information of the second PDU session, and the local routing node selection information, where the second local routing node provides a local routing service for the second terminal device.

Optionally, the binding information further includes session information of a second PDU session, the second PDU session is a session established by a second terminal device, and the processing module 43 is configured to:

select a second local routing node based on the first local routing node, the session information of the first PDU session, the session information of the second PDU session, and the local routing node selection information, where the second local routing node provides a local routing service for the second terminal device.

Optionally, the binding information further includes session information of a second PDU session, the second PDU session is a session established by a second terminal device, and the processing module 43 is configured to:

select the first local routing node and a second local routing node based on the session information of the first PDU session, the session information of the second PDU session, and the local routing node selection information, where the second local routing node provides a local routing service for the second terminal device.

Optionally, the sending module 44 is further configured to send second routing information to the second local routing node, where the second routing information includes the group ID, the air interface identifier of the first terminal device, and an air interface identifier of the second terminal device, or the second routing information includes the group ID, the air interface identifier of the first terminal device, the air interface identifier of the second terminal device, and a local routing rule, and the local routing rule is used by the second local routing node to perform local routing.

Optionally, the local routing node selection information includes one or more of topology information, a selection policy, configuration information, capability information, and a local routing node list sent by the sink node.

Optionally, the receiving module 41 is further configured to receive a group modification request sent by a sink node, where the group modification request includes any one or more of the group ID, an updated group member list, an updated local routing node list, an updated local switching indication, and an updated service identifier.

The processing module 43 is further configured to: update the group information based on the group modification request; and obtain updated binding information, where the updated binding information includes the group ID and session information of at least one updated PDU session.

Optionally, the receiving module 41 is further configured to receive a group deletion request sent by a sink node, where the group deletion request includes the group ID that is requested to be deleted.

The sending module 44 is further configured to send a local route deletion indication to the first local routing node and/or a second local routing node, where the local route deletion indication includes the group ID that is requested to be deleted.

The receiving module 41 is further configured to receive an acknowledgment message that is sent by the first local routing node and/or the second local routing node and that indicates that a local route has been deleted.

The processing module 43 is further configured to: delete association information, where the association information includes the group ID and a local routing node list; and delete the binding information.

The sending module 44 is further configured to send, to the sink node, an acknowledgment message indicating that the binding information has been deleted.

Optionally, the receiving module 41 is further configured to receive a group information query request sent by a sink node, where the group information query request includes the group ID.

The sending module 44 is further configured to send the group information or one or more of the group information, the binding information, association information, and topology information to the sink node.

The apparatus in this embodiment may be configured to execute the technical solutions in the method embodiments shown in FIG. 8, and FIG. 9A and FIG. 9B, and implementation principles and technical effects thereof are similar. Details are not described herein.

Figure 17:
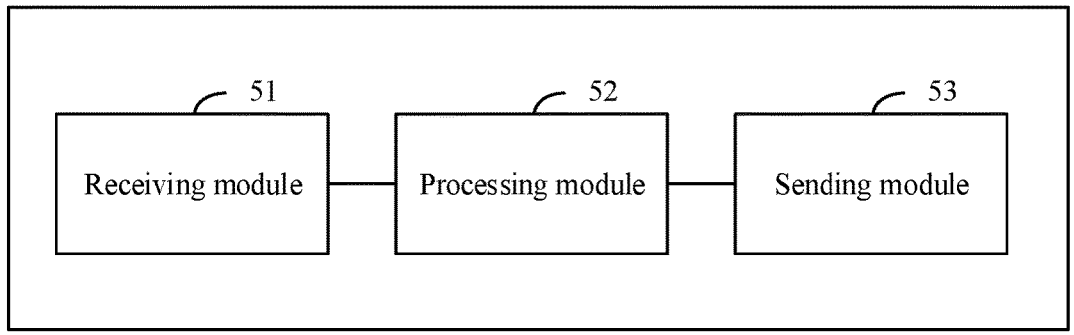
FIG. 17 is a schematic diagram of a structure of an embodiment of a data transmission apparatus according to this application.

FIG. 17 is a schematic diagram of a structure of an embodiment of a data transmission apparatus according to this application. As shown in FIG. 17, the apparatus in this embodiment may include a receiving module 51, a processing module 52, and a sending module 53.

The receiving module 51 is configured to receive routing information sent by an air node, where the first routing information includes a group identifier ID and an air interface identifier of a first terminal device, or the routing information includes the group ID, the air interface identifier of the first terminal device, and a local routing rule, and the local routing rule is used to indicate the local routing node to perform local routing.

The receiving module 51 is further configured to receive user plane data sent by the first terminal device.

The processing module 52 is configured to: determine, based on the air interface identifier of the first terminal device, a group to which the first terminal device belongs, and obtain the corresponding local routing rule through matching based on the group.

The sending module 53 is configured to forward the user plane data according to the local routing rule and a local switching indication.

Optionally, the receiving module 51 is further configured to receive the local switching indication sent by the air node; and the processing module 52 is further configured to generate the local routing rule; or the receiving module 51 is further configured to receive the local routing rule and the local switching indication that are sent by the air node.

Optionally, the receiving module 51 is further configured to receive a local route deletion indication sent by the air node, where the local route deletion indication carries the group ID that is requested to be deleted. The processing module 52 is further configured to: delete the local routing rule corresponding to the group ID, and restore an initially configured routing rule.

Optionally, the local switching indication is an Ethernet layer switching indication or an internet protocol layer switching indication.

The apparatus in this embodiment may be configured to execute the technical solutions in the method embodiments shown in FIG. 8, and FIG. 9A and FIG. 9B, and implementation principles and technical effects thereof are similar. Details are not described herein.

In this application, function modules in the data processing apparatus may be obtained through division according to the foregoing method examples. For example, each function module corresponding to each function may be obtained through division, or two or more functions may be integrated in one processing module. The integrated module may be implemented in a form of hardware, or may be implemented in a form of a software function module. It should be noted that, in the embodiments of this application, module division is used as an example, and is merely logical function division. During actual implementation, another division manner may be used.

Figure 18:
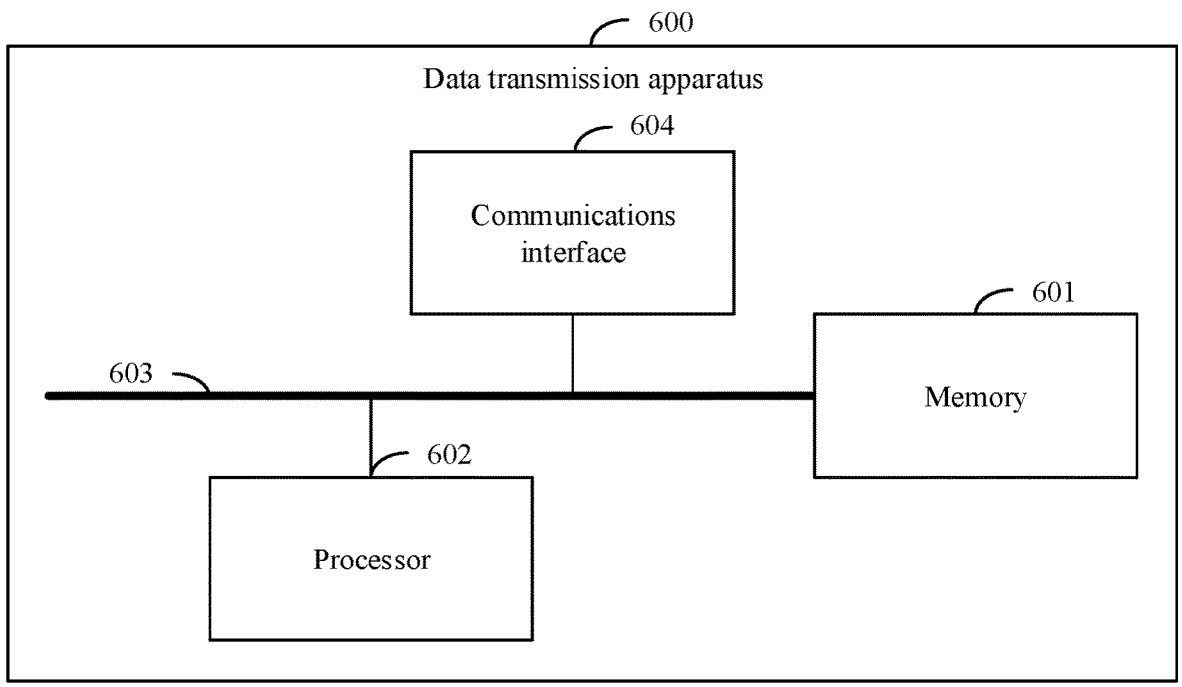
FIG. 18 is a schematic diagram of a structure of a data transmission apparatus according to this application.

FIG. 18 is a schematic diagram of a structure of a data transmission apparatus according to this application. As shown in FIG. 9A and FIG. 9B, the data transmission apparatus 600 includes a memory 601 and a processor 602.

The memory 601 is configured to store a computer program.

The processor 602 is configured to execute the computer program stored in the memory, to implement the data transmission method in the foregoing embodiments. For details, refer to related descriptions in the foregoing method embodiments.

Optionally, the memory 601 may be independent, or may be integrated with the processor 602.

When the memory 601 is a device independent of the processor 602, the data transmission apparatus 600 may further include:

a bus 603, configured to connect the memory 601 and the processor 602.

Optionally, this embodiment further includes a communications interface 604. The communications interface 604 may be connected to the processor 602 through the bus 603. The processor 602 may control the communications interface 603 to implement the foregoing receiving and sending functions of the data transmission apparatus 600.

This application further provides a readable storage medium. The readable storage medium stores executable instructions. When at least one processor in a data transmission apparatus executes the executable instructions, the data transmission apparatus performs the data transmission method in the foregoing method embodiments.

This application further provides a program product. The program product includes executable instructions. The executable instructions are stored in a readable storage medium. At least one processor in a data transmission apparatus can read the executable instructions from the readable storage medium, and the at least one processor executes the executable instructions, so that a terminal device implements the data transmission method in the foregoing method embodiments.

This application further provides a chip. The chip is connected to a memory, or a memory is integrated into the chip. When a software program stored in the memory is executed, the data transmission method in the foregoing method embodiments is implemented.

A person of ordinary skill in the art may understand that all or some of the foregoing embodiments may be implemented by using software, hardware, firmware, or any combination thereof. When the software is used to implement the embodiments, the embodiments may be implemented all or partially in a form of a computer program product. The computer program product includes one or more computer instructions. When the computer program instructions are loaded and executed on a computer, all or some of the procedures or the functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium, For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A data transmission apparatus comprising:
a processor, and
a memory having processor-executable instructions stored thereon which upon being executed by the processor cause the data transmission apparatus to:
receive a first message sent by a first terminal device, wherein the first message is used to request to establish a first protocol data unit (PDU) session;
receive a second message sent by a second terminal device, wherein the second message is used to request to establish a second PDU session;
determine, based on group information associated with the first and second terminal devices, that each of the first and second terminal devices needs to perform local routing,
wherein the group information comprises a group identifier (ID) and a group member list,
wherein the group ID identifies a group comprising the first and second terminal devices, and
wherein the group member list is a list of group member IDs;
obtain binding information that comprises the group ID and session information for each of the first PDU session and the second PDU session,
wherein the session information for each of the first PDU session and the second PDU session comprises one or more of a session ID, a tunnel endpoint identifier (TEID), and a flow identifier (QFIs) of the first or second PDU session; and
send the binding information to a first access network node,
wherein the binding information enables the first access network node to select first and second local routing nodes associated with the first and second PDU sessions, respectively,
wherein selection of the second local routing node is based on (a) the first local routing node or the session information of the first PDU session, (b) the session information of the second PDU session, and (c) local routing node selection information, and
wherein the local routing node selection information includes one or more of topology information, a selection policy, configuration information, capability information and a local routing node list.

2. The apparatus according to claim 1, wherein the first message comprises a service identifier, and the memory has further processor-executable instructions stored thereon that, upon being executed by the processor, cause the apparatus to:
determine, based on the group information associated with the first terminal device and the service identifier, that the first terminal device needs to perform local routing.

3. The apparatus according to claim 2, wherein the service identifier comprises the session ID of the first PDU session and/or a data network name (DNN), and the memory has further processor-executable instructions stored thereon that, upon being executed by the processor, cause the apparatus to:
determine, based on the group information corresponding to the first terminal device and the session ID of the first PDU session and/or the DNN, that the first terminal device needs to perform local routing.

4. The apparatus according to claim 1, wherein the memory has further processor-executable instructions stored thereon that, upon being executed by the processor, cause the apparatus to:
receive a group establishment request sent by an application function (AF) network element, wherein the group establishment request comprises the group ID; and
store the group ID in the group information.

5. The apparatus according to claim 4, wherein the group establishment request further comprises a local switching indication, and the memory has further processor-executable instructions stored thereon that, upon being executed by the processor, cause the apparatus to send the local switching indication to the first access network node.

6. The apparatus according to claim 1, wherein the first access network node comprises integrated access and backhaul (IAB) donor node functionality.

7. The apparatus according to claim 6, wherein at least the first local routing node also comprises IAB donor node functionality.

8. A data transmission apparatus comprising:
a processor; and
a memory having processor-executable instructions stored thereon which upon being executed by the processor cause the data transmission apparatus to:
receive binding information sent by a core network element, wherein the binding information comprises an identifier (ID) of a group comprising first and second terminal devices and session information of first and second protocol data unit (PDU) sessions, and wherein the first PDU session is a session established by the first terminal device and the second PDU session is a session established by the second terminal device;
select a first local routing node based on the session information of the first PDU session and local routing node selection information,
select a second local routing node based on (a) the first local routing node or the session information of the first PDU session, (b) the session information of the second PDU session, and (c) the local routing node selection information, wherein each of the first and second local routing nodes provides a local routing service for the first and second terminal devices, respectively; and send first routing information to the first local routing node, wherein the first routing information comprises the group ID and an air interface identifier for each of the first and second terminal devices, or the first routing information comprises the group ID, the air interface identifier of the first terminal device, and a local routing rule that indicates the first local routing node to perform local routing, and wherein the air interface identifier of the first terminal device is determined based on the session information of the first PDU session.

9. The apparatus according to claim 6, wherein the memory has further processor-executable instructions stored thereon that, upon being executed by the processor, cause the apparatus to:

send second routing information to the second local routing node, wherein the second routing information comprises the group ID, the air interface identifier of the first terminal device, and the air interface identifier of the second terminal device, or wherein the second routing information comprises the group ID, the air interface identifier of the first terminal device, the air interface identifier of the second terminal device and the local routing rule.

10. The apparatus according to claim 8, wherein the local routing node selection information comprises one or more of topology information, a selection policy, configuration information, capability information, and a local routing node list sent by the core network element.

11. The apparatus according to claim 8, wherein the memory has further processor-executable instructions stored thereon that, upon being executed by the processor, cause the apparatus to:

receive a local switching indication sent by the core network element, wherein the first routing information further comprises the local switching indication.

12. The apparatus according to claim 8, wherein the apparatus further comprises integrated access and backhaul (IAB) donor node functionality.

13. The apparatus according to claim 12, wherein at least the first local routing node also comprises IAB donor node functionality.

14. A data transmission apparatus comprising:

a processor; and a memory having processor-executable instructions stored thereon which upon being executed by the processor cause the data transmission apparatus to:

receive first routing information sent by a first access network node, wherein the first routing information comprises a group identifier (ID) and an air interface identifier of a first terminal device, wherein the air interface identifier of the first terminal device uniquely identifies the first terminal, and wherein the group ID identifies a group of terminals to which the first terminal belongs;

receive user plane data sent by the first terminal device; and forward the user plane data according to a local routing rule and a local switching indication, wherein the local routing rule is included in the first routing information or is determined from the group ID, and wherein the local switching indication is included in the first routing information or sent separately by the first access network node.

15. The apparatus according to claim 14, wherein the local switching indication is an Ethernet layer switching indication or an internet protocol layer switching indication.

16. The apparatus according to claim 14, wherein the memory has further processor-executable instructions stored thereon that, upon being executed by the processor, cause the apparatus to:

delete the local routing rule associated with the group ID, and restore an initially configured routing rule.

17. The apparatus according to claim 14, wherein the air interface identifier of the first terminal device is determined based on session information of a protocol data unit (PDU) session established by the first terminal device.

18. The apparatus according to claim 14, wherein the first routing information further comprises the local switching indication.

19. The apparatus according to claim 14, wherein the apparatus further comprises integrated access and backhaul (IAB) donor node functionality.

20. The apparatus according to claim 19, wherein at least the first access network node also comprises IAB donor node functionality.

* * * * *